(12) United States Patent
Gao

(10) Patent No.: US 8,632,011 B2
(45) Date of Patent: Jan. 21, 2014

(54) SYSTEMS AND METHODS FOR ILLUMINATING A SCAN VOLUME OF AN OPTICAL CODE READER

(75) Inventor: WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/352,257

(22) Filed: Jan. 17, 2012

(65) Prior Publication Data

US 2012/0181338 A1 Jul. 19, 2012

Related U.S. Application Data

(60) Provisional application No. 61/433,811, filed on Jan. 18, 2011.

(51) Int. Cl.
*G06K 7/10* (2006.01)
(52) U.S. Cl.
USPC .................................. 235/455; 235/462.2
(58) Field of Classification Search
USPC ............ 235/445, 462.2, 462.21, 462.22, 455
See application file for complete search history.

(56) References Cited

U.S. PATENT DOCUMENTS

| | | | |
|---|---|---|---|
| 4,861,972 A | 8/1989 | Elliott et al. | |
| 4,866,257 A | 9/1989 | Elliott et al. | |
| 5,163,102 A | 11/1992 | Yamazaki et al. | |
| 5,463,213 A | 10/1995 | Honda | |
| 5,493,108 A | 2/1996 | Cherry et al. | |
| 5,572,006 A * | 11/1996 | Wang et al. | 235/454 |
| 5,581,071 A | 12/1996 | Chen et al. | |
| 5,636,040 A | 6/1997 | Tung | |
| 6,095,417 A | 8/2000 | Ahlquist et al. | |
| 6,142,376 A | 11/2000 | Cherry et al. | |
| 6,557,764 B1 | 5/2003 | Reasoner et al. | |
| 6,606,171 B1 | 8/2003 | Renk et al. | |
| 6,612,495 B2 | 9/2003 | Reddersen et al. | |
| 6,749,120 B2 | 6/2004 | Hung et al. | |
| 6,877,663 B2 | 4/2005 | Kelly | |
| 7,025,271 B2 | 4/2006 | Dvorkis et al. | |
| 7,178,733 B2 | 2/2007 | Zhu | |
| 7,204,420 B2 | 4/2007 | Barkan et al. | |
| 7,264,166 B2 | 9/2007 | Barkan | |

(Continued)

FOREIGN PATENT DOCUMENTS

| | | |
|---|---|---|
| JP | 05-043265 U | 6/1993 |
| JP | 05-250508 A | 9/1993 |
| JP | 2000-515655 | 11/2000 |
| JP | 2001326386 A | 11/2001 |

OTHER PUBLICATIONS

International Search Report, PCT/US2012/021748, Jul. 19, 2012.

*Primary Examiner* — Karl D Frech
(74) *Attorney, Agent, or Firm* — Stoel Rives LLP

(57) ABSTRACT

Methods and systems of illuminating a scan volume of an optical code reader are disclosed. In an example configuration, an illumination source associated with the optical code reader is set to a first illumination mode based on a user-configurable parameter that at least partially defines a first depth of field of the optical code reader when the illumination source illuminates the scan volume; while the illumination source is in the first illumination mode, the scan volume is monitored for an indication of whether an object is detected in the scan volume; and if an object is detected in the scan volume while the illumination source is in the first illumination mode, the illumination source is set to a second illumination mode.

20 Claims, 17 Drawing Sheets

(56) References Cited

U.S. PATENT DOCUMENTS

| | | |
|---|---|---|
| 7,527,207 B2 | 5/2009 | Acosta et al. |
| 2003/0091244 A1 | 5/2003 | Schnee et al. |
| 2005/0023352 A1 | 2/2005 | Patel et al. |
| 2007/0090191 A1 | 4/2007 | Schnee et al. |
| 2007/0284447 A1 | 12/2007 | McQueen |
| 2007/0297021 A1 | 12/2007 | Smith |
| 2008/0029603 A1 | 2/2008 | Harris |

* cited by examiner

SYSTEMS AND METHODS FOR ILLUMINATING A SCAN VOLUME OF AN OPTICAL CODE READER

RELATED APPLICATIONS

This application is a nonprovisional of and claims the benefit under 35 U.S.C. §119(e) of U.S. Provisional Patent Application No. 61/433,811, filed Jan. 18, 2011, which is hereby incorporated by reference in its entirety.

BACKGROUND

The field of the present disclosure relates generally to optical code readers and, in particular, to systems and methods for adjusting an illumination mode of an optical code reader.

An optical code, such as a barcode, is essentially a machine-readable representation of information in a visual format. Some optical codes use a dark ink on a white substrate to create high and low reflectance upon scanning or reading of the optical code. (For the purposes of the present description, the terms scan and read, may be used interchangeably to connote acquiring data associated with an optical code. Likewise, scanner and optical code reader may be used interchangeably to connote devices used to acquire data associated with an optical code.) Based on the symbology being used (e.g., UPC, Code 39, Code 128, and PDF417), an optical code may comprise data characters (or codewords in the case of, e.g., PDF417) and/or overhead characters represented by a particular sequence of bars and spaces that may have varying widths.

Optical codes have widespread applications. For example, optical codes can be used to identify a class of objects (e.g., merchandise) or unique items (e.g., patents). As a result, optical codes are found on a wide variety of objects, such as retail goods, company assets, and documents. The optical codes are placed on items and read as the items arrive or as they are sold to help track production at manufacturing facilities or inventory at stores.

In addition, optical codes may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause an optical code to be displayed on their portable electronic device so that an employee (e.g., merchant-employee) can read the optical code via an optical code reader to allow the customer to redeem a coupon or to verify that the customer has purchased a ticket for the event.

Optical code readers are a type of data reader used to capture optical codes or other symbols or information appearing on various surfaces in order to read the information encoded in the optical code or symbol. One commonly used optical code reader is an imaging based reader. Imaging based readers typically include solid state image circuitry, such as charge coupled devices (CCDs) or complementary metal-oxide semiconductor (CMOS) devices, and may be implemented using a one-dimensional or two-dimensional imaging array of photosensors (or pixels) to capture an image of the optical code. One-dimensional CCD readers capture a linear cross section of the optical code, producing an analog waveform whose amplitude represents the relative darkness and lightness of the optical code. Two-dimensional CCD or CMOS readers may capture an entire two-dimensional image.

Although some optical code readers rely on ambient light when capturing an image of an optical code, many optical code readers utilize an illumination source to illuminate the optical code in an attempt to improve the image data quality generated by the imaging device. The illumination source may facilitate low noise image capture and may also delineate the field of view of the optical code reader to help the user aim the optical code reader or position the object bearing the optical code. In some situations, however, the illumination intensity provided by the illumination source may be substantial and counterproductive.

DETAILED DESCRIPTION OF EMBODIMENTS

With reference to the above-listed drawing, this section describes particular embodiments and their detailed construction and operation. The embodiments described herein are set forth by way of illustration only and not limitation. Skilled persons will recognize in light of the teachings herein that, for example, other embodiments are possible, variations can be made to the embodiments described herein, and there may be equivalents to the components, parts, or steps that make up the described embodiments. For example, various types of data acquisition devices, such as optical code readers, are generally known including imaging-based optical code readers and laser scanners, both fixed and handheld.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Figure 1:
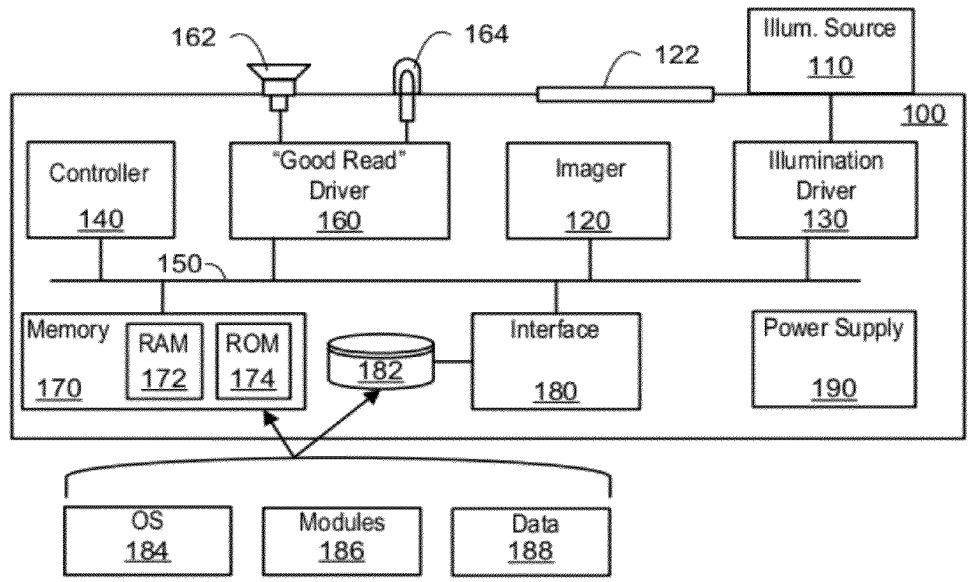
FIG. 1 is a block diagram of an optical code reader, according to one embodiment.

FIG. 1 is a block diagram of an optical code reader 100, according to one embodiment. The present inventor has recognized that providing relatively bright illumination from an optical code reader may not be needed or desirable in every instance. In fact, bright illumination may cause eye fatigue for operators, especially when the operator is using an in-counter optical code reader while seated. Thus, the optical code reader 100 includes an illumination source 110 and an illumination driver or controller 130, the optical code reader 100 preferably including a programmable illumination setting for one or more modes of operation. For example, the optical code reader 100 may include a default mode by which the illumination source 110 is set to a relatively dim level in which the optical code reader 100 is still capable of reading an optical code within a scan volume of the optical code reader 100 (e.g., proximate window 122). After the optical code reader 100 detects an object in the scan volume, the optical code reader 100 enters a detected-object mode (e.g., for the next image frame) in which the illumination source 110 is set to another level. For example, when in the default mode, the illumination source 110 may be driven with a series of pulses having a pulse width of approximately 70 μsec to produce a scan volume having a depth of field of approximately 5 inches. When the optical code reader 100 enters the detected-object mode, the pulse width may be increased to approximately 140 μsec, which increases the perceived intensity of the illumination source 110 and increases the depth of field to approximately 8 inches, for example. Other methods of changing the illumination setting, such as turning on other or additional illumination sources (visible or non-visible such as infrared) or increasing the drive current supplied to the illumination source, will be discussed in more detail below.

The illumination setting associated with the default mode is preferably programmable. In other words, the user may program the optical code reader 100 so that the illumination source 110 produces a desired optical output when the optical code reader 100 is in the default mode. For example, if a cashier is standing while using the optical code reader 100, the illumination setting in the default mode may be set to a relatively bright level. If, on the other hand, the cashier is sitting while using the optical code reader 100, the illumination setting in the default mode may be set to a relatively dim level for better visual effect. In other words, if the cashier is near the illumination source 110 while using the optical code reader 100, setting the default mode to a relatively dim level may be easier on the cashier's eyes (e.g., cause less eye fatigue, especially for in-counter scanners such as a bi-optic scanner). Thus, the cashier may change the illumination setting of the optical code reader 100 when the optical code reader 100 is in the default mode based on the use case. Likewise, the illumination setting associated with the detected-object mode may be programmable. Thus, according to one embodiment, the optical code reader 100 can be configured by the user so that the illumination source 110 produces a first desired optical output (e.g., "off," "dim," "medium," or "bright") when the optical code reader 100 is in the default mode and produces a second desired optical output (e.g., "off," "dim," "medium," or "bright") when the optical code reader 100 is in the detected-object mode.

For example, the cashier may program the optical code reader 100 so that the illumination source 110 produces a "dim" optical output (e.g., a relatively short pulse width or red light only) when the optical code reader 100 is in the default mode and produces a "bright" optical output (e.g., the illumination sources is driven with longer pulse widths or other illumination sources are turned on) when the optical code reader 100 is in the detected-object mode. When operating in the default mode, the optical code reader 100 can read an optical code if a label is swept through the scan volume in the near field (close to the window 122) e.g., approximately zero to five inches from the scan window 122, but not in the far field (farther from the window 122) e.g., approximately five to eight inches from the scan window 122. If the optical code reader 100 detects an object in the scan volume, such as an optical code, the optical code reader 100 enters the detected-object mode. The depth of field of the optical code reader 100 is greater when the optical code reader 100 is in the detected-object mode (as compared to the default mode) because, for example, the illumination sources is driven with longer pulse widths or other sources of illumination are turned on when the optical code reader 100 is in the detected-object mode. Thus, when the optical code reader 100 is operating in the detected-object mode, the optical code reader 100 is able to read optical codes over the whole working range of the scan volume. If no object is detected for a predetermined duration, such as ten image frames, the optical code reader 100 returns to the default mode.

Referring again to FIG. 1, various components of the optical code reader 100 are illustrated, according to one embodiment. The optical code reader 100 includes an imager 120 and the illumination source 110. According to one embodiment, the illumination source 110 comprises one or more light emitting diodes (LEDs). One suitable imager is the model EV76C560 CMOS sensor offered by e2v Technologies PLC, Essex, England (http://www.e2v.com), for example. Another suitable imager is the model MT9V022 sensor sold by Micron Technology, Inc. of Boise, Id. For convenience, the optical code reader 100 will be described with reference to the imager 120 and the illumination source 110, but it should be understood that other suitable sensor devices or light sources may be employed. An illumination driver or controller 130 is optionally provided. The illumination driver 130 is configured to apply signals to the illumination source 110 to, for example, strobe the illumination source 110 at desired times or to light the illumination source 110 constantly for a period of time. According to one embodiment, the illumination driver 130 drives the illumination source with a series of illumination pulses having a given pulse width (see, e.g., FIGS. 6, 7, 11, and 12). In general, increasing the pulse width increases the perceived intensity of illumination by increasing the percentage of time in which the illumination source 110 is on during the illumination pulse cycle (i.e., by increasing the duty cycle of the illumination waveform).

The imager 120 and the illumination driver 130 connect to a controller 140, which may be, for example, a processor, microprocessor, controller, microcontroller, or the like. The connection may be via a bus 150 or other communication mechanism, such as direct connections of a serial, parallel, or other type. The controller 140 generally controls and coordinates the operation of other devices to which it is connected, such as one or more of the imager 120, the illumination driver 130, and a "good read" driver 160. The "good read" driver 160 is optionally included to drive a beeper 162 (or buzzer, speaker, or other audible indicator) to produce an audible "beep" or other indication when an optical code is successfully read. In addition, or alternatively, the "good read" driver 160 drives an LED 164 or other visual indicator when a code has been successfully read. Other devices or subsystems, such as a cash register or electronic scale, may also be connected to the controller 140. Moreover, the controller 140 and/or the bus 150 may interface with other controllers or computers, such as a cash register system or check-out terminal.

The optical code reader 100 also includes memory 170, which may be implemented using one or more standard memory devices. The memory devices may include, for instance, RAM 172, ROM 174, and EEPROM devices, and may also include magnetic or optical storage devices, such as hard disk drives, flash memory, CD-ROM drives, and DVD-ROM drives. The optical code reader 100 may also include an interface 180 coupled to an internal memory, such as a hard disk drive 182. In addition, or alternatively, the interface 180 may be coupled to flash memory, a magnetic floppy disk drive, an optical disk drive, or another memory or drive and may be configured for external drive implementations, such as over a USB, IEEE 1194, or ExpressCard connection.

According to one embodiment, any number of program modules are stored in the drives (e.g., drive 182) and ROM 174, including an operating system (OS) 184, one or more application programs or modules 186, such as instructions to implement the methods described herein, and data 188. All or portions of the program modules may also be cached in RAM 172. Any suitable operating system 184 may be employed. One of the program modules 186 may comprise a set of instructions to implement the methods for illuminating a scan volume of an optical code reader described herein. For example, one of the program modules 186 may comprise a set of instructions to implement the method 1300 illustrated in FIG. 13A, the method 1400 illustrated in FIG. 14, and the method 1500 illustrated in FIG. 15. The data 188 may include one or more configuration settings or parameters, such as the illumination setting or settings associated with the default mode, the detected-object mode, or both. The data 188 may also include image data from the imager 120 and decoded optical code data.

The optical code reader 100 may include a number of other components that interface with one another via the bus 150, including a display controller and display device, an input controller, and a network interface. The display controller and display device may be provided to present data, menus, and prompts, and otherwise communicate with the user via one or more display devices, such as a transmissive or reflective liquid crystal display (LCD), cathode ray tube (CRT) display, or other suitable display. For example, as will be described in more detail below, the display controller and display device may be configured to display a navigable menu system or graphical user interface (GUI) that allows the user to select the illumination setting or settings.

The input controller may be configured to receive user input from one or more input devices, such as a keyboard, a pointing device, or other wired/wireless input devices, that allow the user to, for example, select the illumination setting or settings or otherwise configure the optical code reader 100. Other input devices may be included, such as a microphone, touchscreen, touchpad, and trackball. While the input devices may be integrated into the optical code reader 100 and coupled to the processor 140 via the input controller, input devices may also connect via other interfaces, such as a connector that includes one or more data interfaces, bus interfaces, wired or wireless network adapters, or modems for transmitting and receiving data. Accordingly, the input controller may include one or more of hardware, software, and firmware to implement one or more protocols, such as stacked protocols along with corresponding layers. Thus, the connector may function as one or more of a serial port (e.g., RS232), a Universal Serial Bus (USB) port, and an IR interface. The input controller may also support various wired, wireless, optical, and other communication standards.

The network interface may optionally be provided to communicate with one or more hosts or other devices (e.g., a computer, a point-of-sale terminal, a point-of-sale computer system, or a cash register). For example, data gathered by or decoded by the optical code reader 100 may be passed along to a host computer. According to one embodiment, the network interface comprises a universal interface driver application specific integrated circuit (UIDA). Further details of the UIDA can be found in U.S. Pat. No. 6,877,663, which is hereby incorporated by reference in its entirety. The network interface may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), advanced technology attachment (ATA), personal computer memory card international association (ExpressCard), and USB. A wireless connection may use low or high powered electromagnetic waves to transmit data using any wireless protocol, such as Bluetooth™, IEEE 802.11a/b/g/n (or other WiFi standards), infrared data association (IrDa), and radiofrequency identification (RFID).

The optical code reader 100 also includes one or more power supplies 190, which provide electrical power to the various components of the optical code reader 100 via power connections.

Optical code readers according to other embodiments may have less than all of these components, may contain other components, or both. For example, an optical code reader may comprise a multi-window scanner, such as a two window scanner sometimes referred to as a bi-optic scanner, including a lower window arranged in a generally horizontal plane and an upper window arranged in a generally vertical plane with one or more optical code readers attempting to read encoded symbols through the windows. The one or more optical code readers may comprise one or more of a laser scanner (e.g., a flying spot laser scanner that obtains optical code information by sweeping a laser spot across the optical code) or an imaging reader. An optical code reader may also comprise a portable scanner, such as a handheld scanner. In addition, an optical code reader may be combined with a radio frequency identification (RFID) reader or a magnetic strip reader.

According to a first embodiment, the optical code reader 100 comprises an on-counter scanner, such as a Magellan® 1100i on-counter presentation onmni directional barcode reader or a Magellan® 3200 VSi on-counter vertical presentation scanner, both of which are manufactured by Datalogic ADC, Inc. of Eugene, Oregon. According to a second embodiment, the optical code reader 100 comprises an in-counter scanner, such as a Magellan® 3300 HSi in-counter barcode reader manufactured by Datalogic ADC, Inc. of Eugene, Oregon.

Figure 2:
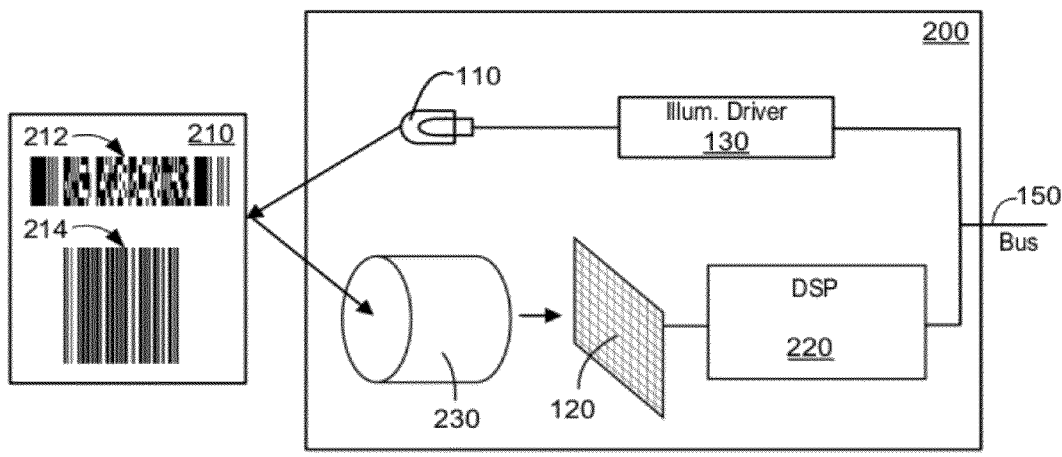
FIG. 2 is a block diagram of an optical code reader reading an optical code, according to one embodiment.

FIG. 2 is a block diagram of an optical code reader 200 reading an optical code from an item or object 210, according to one embodiment. The optical code reader 200 is similar to the optical code reader 100, except that the optical code reader 200 also comprises a digital signal processor (DSP) 220 and lens assembly 230. In FIG. 2 various components, such as the controller 140, are not illustrated for conciseness. The DSP 220 and the illumination driver 130 connect to the controller 140 via the bus 150 or by another communication mechanism, such as a direct connection.

The object 210 typically includes an optical code, such as barcode 212 (PDF417) and barcode 214 (Code 128). The illumination source 110 may comprise any suitable source of light, such as LEDs, flash strobes, incandescent or fluorescent lamps, or halogen bulbs. The lens assembly 230 may comprise one or more lenses for focusing light onto the imager 120. For example, the lens assembly 230 may comprise a single optical element or may comprise an array of optical elements with a common axis. The lens assembly 230 may also comprise a zoom lens coupled to the controller 140 to control an amount of optical zoom. The imager 120 forms an electronic image of the object 210. The imager 120 may comprise a wide range of image sensing devices for converting an optical image of various wavelengths into an electrical signal. The image may be a visible image composed of wavelengths in the range of approximately 380 nm to 750 nm or it may contain or be composed primarily of wavelengths of the electromagnetic spectrum that are outside the visible range (e.g., infrared light). For example, the imager 120 may be a charge-coupled device (CCD) or complimentary metal-oxide semiconductor (CMOS) imager, both of which form a one-dimensional or two-dimensional array of pixels, which together constitute an electronic representation of the image. Each pixel location stores data indicative of the light intensity at that location of the image. The light intensity data for each pixel may represent a color (e.g., red-green-blue) or monochrome intensity (e.g., grayscale).

After the imager 120 has been exposed to light reflected by the object 210, data from all or a portion of the pixels can be sequentially read out in a selectable pattern (which may be row-by-row, column-by-column, or some other pattern). The pixel intensity data may optionally be converted to digital form using an analog-to-digital converter circuit before being sent to the DSP 220. The DSP 220 may be, for example, a true DSP architecture, such as the Blackfin® processor family from Analog Devices, Norwood, Mass., or a microcontroller, such as the high speed ARM® processor family from ARM Ltd., Cambridge, United Kingdom. The DSP 220 is interfaced to the imager 120 in such a way as to read image data from the imager. Briefly stated, the DSP 220 processes the image data so as to attempt to decode a readable barcode image that has been focused onto the imager. The DSP 220 may condition the data received from the imager 120 and may generate an output that generally identifies which regions of the image correspond to light areas, and which correspond to dark areas. For example, the DSP 220 may set the thresholding so that the bars or relatively darker regions of the barcode or other target are reported as being dark, and the spaces or relatively lighter regions between the bars or darker regions are reported as being light, according to any of a number of techniques. According to one embodiment, the imager 120 and the DSP 220 may be contained in the same integrated circuit. According to another embodiment, the DSP 220 functionality may be implemented by the controller 140 (FIG. 1) or one or more other logic machines capable of executing instructions. The DSP 220 may additionally or alternatively perform or facilitate other functions, such as recording frames of imager data for later analysis or testing. Additional details of image processing and decoding are described below.

Figure 3:
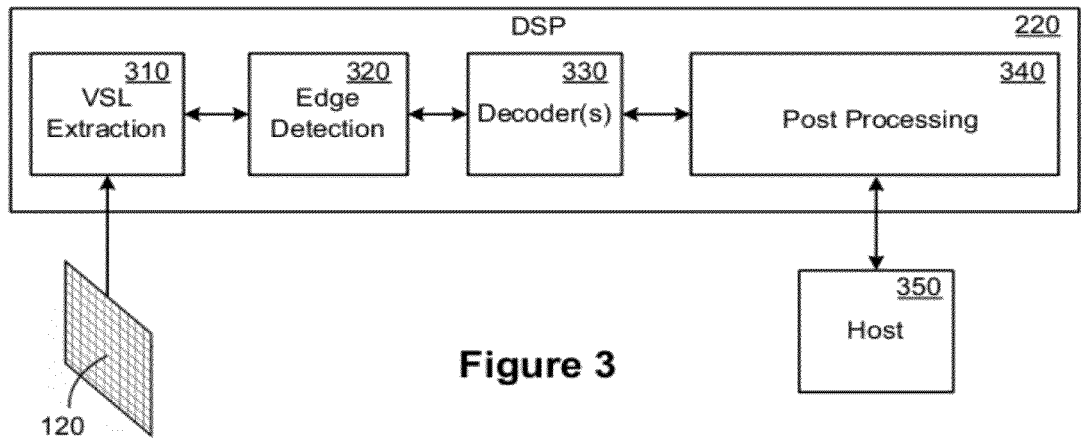
FIG. 3 is a block diagram illustrating a digital signal processor, according to one embodiment.

FIG. 3 is a block diagram illustrating the DSP 220, according to one embodiment. Preferably, only a select portion (e.g., every Nth row) or sub-region of the image data captured by the imager 120 corresponding to one or more sub-regions is stored and processed. Optionally, the select portion or sub-region may be stored in a memory, such as memories 170 or 182. According to another embodiment, all of the image data captured by the imager 120 may be used to search for and decode a barcode (e.g., using any suitable two-dimensional decoding algorithm). The DSP 220 may optionally include or execute a sub-region or virtual scan line extraction module 310 to read or assemble samples or pixels from the imager 120 lying along one or more lines or other defined paths across the image at arbitrary angles with respect to one another or in another desired scan pattern. The sub-region extraction module 310 may define and map sub-regions onto a raster pattern, thereby allowing the pixels of the raster which fall on the sub-regions to be identified and processed for decodable data, and possibly stored for later processing. Storing only a select portion of the image data corresponding to sub-regions reduces the total amount of data that needs to be stored and processed. Additional virtual scan line processing techniques may be implemented, such as the virtual scan line processing techniques that are described in U.S. Pat. No. 6,142,376, which is hereby incorporated by reference in its entirety. The extraction module 310 may be omitted in certain embodiments, such as when a two-dimensional decoding algorithm is used.

An edge detection module 320 identifies edge transition locations in the extracted data using any suitable edge detection technique. For example, after an image of the object 210 has been captured by the imager 120, the image may be represented by a certain number of pixels, each of which is represented by a certain value. For a grayscale image where each pixel is represented by 8 bits, a pixel may have a value ranging from 0 (black) to 255 (white) with various shades of gray between 0 and 255. While the image may be a grayscale image, it may also be a color image or a black-and-white image. Additionally, while each pixel may be represented by 8 bits, each pixel may be represented by any number of bits (e.g., 10 bits or 12 bits). Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixels). With regard to a first derivative, an edge transition can occur at a local maxima or minima. With regard to second derivatives, edges occur at zero crossings. Thus, edges may be located by convolving image data with a kernel that approximates a first or second derivative.

Based on the edge locations, one or more decoders 330 (e.g., low-level decoders, high-level decoders, or any combination thereof) may convert the sequence of edges and spacing between the edges into data usable by a host 350. For example, a low-level decoder may convert the sequence of edges and spacing between the edges into a set of barcode elements, such as start patterns, stop patterns, and codewords, and a high-level decoder may convert the barcode elements into decoded characters, which may be alphanumeric. The specific nature of the decoder(s) varies depending on the particular symbology used to encode the data. For example, in the PDF417 symbology data is encoded by converting data into codewords high-level encoding) and representing the codewords with a certain sequence of bars and spaces (i.e., low-level encoding). Thus in the PDF417 symbology, data may be decoded by converting the sequence of bars and spaces into codewords low-level decoding) and converting the codewords into data (i.e., high-level decoding). Thus, after the edge detection module 320 identifies edges in the data captured by the imager 120, the relative locations of the edge transitions can be converted back into codewords via a low-level decoder and the codewords can be converted into data usable by the host 350 by a high-level decoder. The DSP 220 may include a set of decoders 330 for each symbology the optical code reader 200 is configured to read.

The decoder 330 may also combine partial sections of an optical code to form data representing the complete optical code using a process known as stitching, further details of which can be found in U.S. Pat. No. 5,493,108, which is hereby incorporated by reference in its entirety.

The DSP 220 may include a post processing module 340 to further process the output from the decoder(s) 330 before sending the data to the host 350. For example, the post processing module 340 may include an amplification module to amplify one or more spatial frequencies, a filtering module, and/or a timer module. The timer module may be used to indicate when to stop attempting to find characters. For example, to maximize throughput, the timer module may begin measuring a time interval at some event such as the start of decoding data from an image frame, or the detection of a potential optical code within an image frame, and the edge detection module 320, the decoder(s) 330, or both, may stop looking for characters after a certain period of time or after a certain number of data frames have been captured. In other words, the timer module prevents the edge detection and decoder modules from spending too much time trying to decode data that is not readable or decodable (or at least not easily readable or decodable) or that has already been decoded.

According to one embodiment, the optical code reader 200 transmits the decoded optical code data to the host 350 or another device (e.g., a computer, a point-of-sale terminal, a point-of-sale computer system, or a cash register). The transmission may be performed in a point-to-point manner or may be broadcast over a wired or wireless network. The host 350 (or another device) may present data, prompts, and otherwise communicate with the user via one or more display devices. For example, the host 350 (or another device) may present the decoded data to the user via a display, and may include data such as the object type (e.g., product type) corresponding to the scanned optical code and data associated with the object type (e.g., a price of the product). The data associated with the object type may be encoded in the optical code or accessed from a local or remote database based upon the object type. By way of another example, the host 350 (or another device) may cause the decoded data to be recorded on a tangible medium. For example, the host 350 (or another device) may instruct a printer to print the object type and data corresponding to the object type (e.g., print the product type and associated price on a receipt). The optical code reader 200 may also store the decoded optical code data in memory 170, memory 182, or both memories 170 and 182. For example, if the optical code reader 200 is operating in a portable mode or the host 350 is unavailable, the decoded data may be buffered by the optical code reader 200 for later transmission in a batch mode. Additionally, the optical code reader 200 may acknowledge that optical code data has been successfully decoded, such as by sounding a beep and/or turning on an LED as customarily associated with optical code readers.

Figure 5:
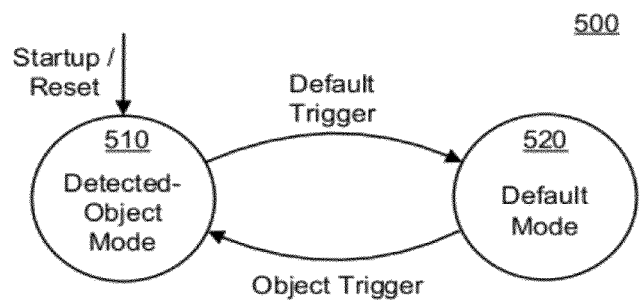
FIG. 5 is a simplified state diagram illustrating two illumination modes of an optical code reader, according to one embodiment.
Figure 4:
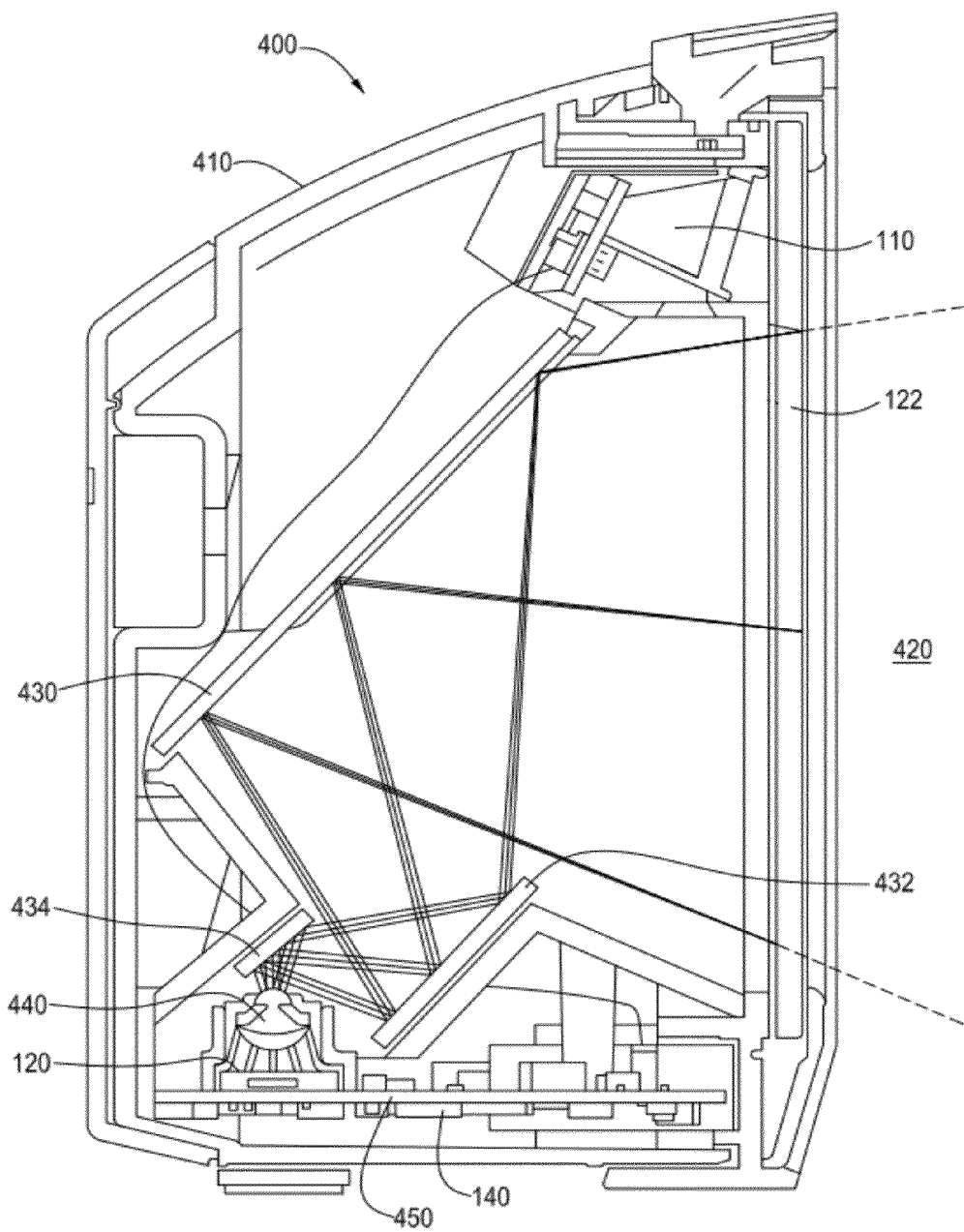
FIG. 4 is a diagrammatic view of an optical code reader, according to one embodiment.

Referring now to FIGS. 4 and 5, various illumination modes of an optical code reader 400 will be described, according to one embodiment. The optical code reader 400 illustrated in FIG. 4 is similar or identical to one or more of the optical code reader 100 and the optical code reader 200. For conciseness, various components, such as the memory 170 are not illustrated or described. The optical code reader 400 has a housing 410 with a front window 122 and one or more illumination sources 110 for illuminating a scan volume 420 in front of the window 122. Conceptually, the scan volume 420 includes a portion of space in front the window 122 in which optical codes may be read (e.g., detected and decoded) by the optical code reader 400. In other words, the scan volume 420 may be referred to as a volume within which there is a relatively high probability of a successful scan/read. After the controller 140 instructs the imager 120 to capture or acquire an image of the scan volume 420, an image of the field of view of the scan volume 420 is reflected by a first mirror 430 downwardly to a second mirror 432, sidewardly to a third mirror 434, and then downwardly where it is focused by focusing optics 440 (e.g., lens assembly 230) onto the imaging array or imager 120. The imager 120 is shown mounted on a printed circuit board 450 disposed on the bottom of the reader housing 410. Preferably, the optical code reader 400 includes the controller 140, the DSP 220, or both the controller 140 and DSP 220 (the DSP 220 may also be mounted on PCB 450) for controlling the operation of the imager 120, the illumination source 110, and other reader components.

The illumination source 110 may be mounted within the housing 410 as illustrated in FIG. 4 or may be mounted external to the housing 410, such as on an exterior surface of the housing 410 or remotely located from the optical code reader 400. For example, the illumination source 110 may be mounted to a separate stand or another part of the check-out stand and positioned some distance from the optical code reader 400.

FIG. 5 is a simplified state diagram 500 illustrating two illumination modes of the optical code reader 400, according to one embodiment. In particular, the state diagram 500 illustrates a detected-object mode 510 and a default mode 520. When the optical code reader 400 is operating in the default mode 520, the illumination source 110 produces a first optical output that at least partially defines a first depth of field of the optical code reader 400. When the optical code reader 400 is operating in the detected-object mode 510, the illumination source 110 produces a second optical output, which preferably increases the depth of field of the optical code reader 400 from the first depth of field to a second depth of field that is greater than the first depth of field.

After the optical code reader 400 is turned on or after the optical code reader 400 is reset (e.g., the user presses a reset button on the optical code reader 400 or the optical code reader 400 initiates a reboot via software), the optical code reader 400 operates in the detected-object mode 510 until a default trigger causes the optical code reader 400 to operate in the default mode 520. The default trigger may be object dependent, time dependent, or both object and time dependent. For example, the default trigger may comprise a lack of an object within the scan volume 420. In other words, the optical code reader 400 may transition from the detected-object mode 510 to the default mode 520 if an object is not within the scan volume or the optical code reader 400 fails to detect an object in the scan volume. By way of another example, the default trigger may be caused by an absence of an object within the scan volume 420 for a predetermined duration (or failure to detect an object in the scan volume for a predetermined duration), such as a predetermined number of image frames or a predetermined period of time.

After the optical code reader 400 transitions to the default mode 520, the optical code reader 400 operates in the default mode 520 until an object trigger causes the optical code reader 400 to transition to the detected-object mode 510. The object trigger may be object dependent, time dependent, or both object and time dependent. For example, the object trigger may comprise the presence of an object within the scan volume 420 or the detection of an object in the scan volume 420. In other words, the optical code reader 400 may transition from the default mode 520 to the detected-object mode 510 if an object is within the scan volume (or the optical code reader 400 detects an object in the scan volume 420). By way of another example, the object trigger may be caused by the presence of an object within the scan volume 420 for a predetermined duration, such as a predetermined number of image frames or a predetermined period of time. After the optical code reader 400 transitions to the detected-object mode 510, the optical code reader 400 operates in the detected-object mode 510 until the default trigger causes the optical code reader 400 to transition again to the default mode 520.

The state or mode of the illumination source 110 when the optical code reader 400 is operating in the detected-object mode 510 or the default mode 520 may be set in a number of ways and may depend on the type of illumination that is used. For example, changing the optical output of the illumination source 110 when the optical code reader 400 switches between the detected-object mode 510 and the default mode 520 may involve one or more of changing a pulse width of a driving waveform, changing an amount of current used to drive the illumination source 110, and changing an amount of light projected into the scan volume 420 by the illumination source 110. Various examples of changing the optical output of the illumination source 110 when the optical code reader 400 switches between the detected-object mode 510 and the default mode 520 are described with reference to FIGS. 6, 7, and 8A.

Figure 6:
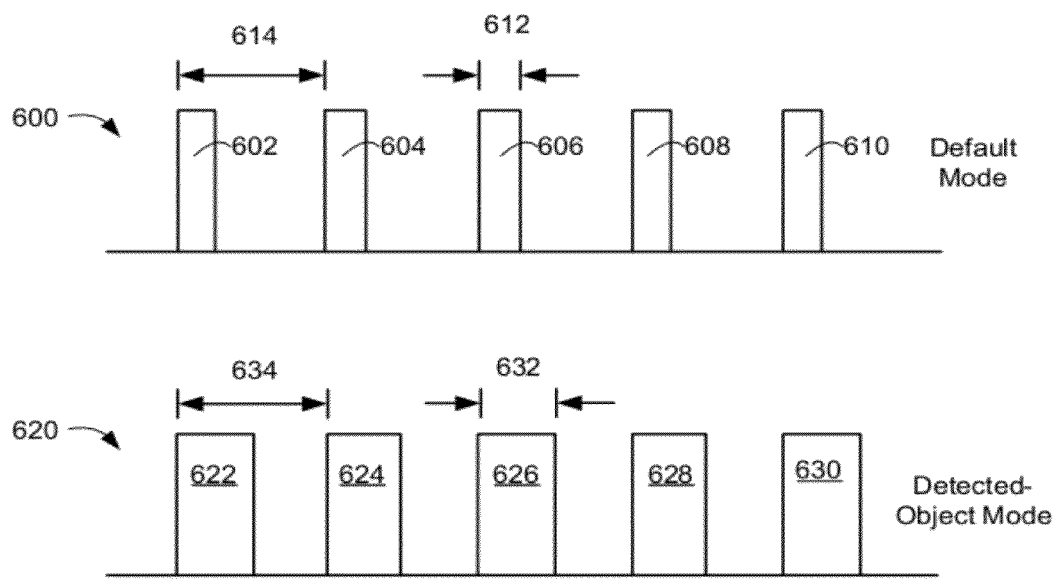
FIGS. 6 and 7 illustrate illumination-driving waveforms, according to various embodiments.

FIG. 6 illustrates illumination-driving waveforms 600 and 620 that are used to drive illumination source 110, according to one embodiment. For example, according to one embodiment, the illumination source comprises one or more LEDs that are configured to illuminate the scan volume 420 with a series of illumination pulses, each of which has a pulse width. To generate the illumination pulses, an illumination driver (e.g., the illumination driver 130) drives the illumination source 110 with a waveform that includes a series of electrical pulses. With reference to FIG. 6, the illumination driver 130 (FIG. 1) drives the illumination source 110 with an illumination-driving waveform 600 when the optical code reader 400 is operating in the default mode 520 and the illumination driver 130 drives the illumination source 110 with an illumination-driving waveform 620 when the optical code reader 400 is operating in the detected-object mode 510.

The illumination-driving waveform 600 includes electrical pulses 602, 604, 606, 608, and 610, each of which has a fixed pulse width 612 that is generated at a predetermined frequency 614. In a similar vein, the illumination-driving waveform 620 includes electrical pulses 622, 624, 626, 628, and 630, each of which has a fixed pulse width 632 that is generated at a predetermined period (frequency) 634. The height of each pulse corresponds to the drive current (e.g., LED drive current). The illumination source 110 is turned on during each of the electrical pulses 602-610 and 622-630, and the illumination source 110 is turned off between each of the electrical pulses 602-610 and 622-630. When the optical code reader 400 transitions from the detected-object mode 510 (i.e., waveform 620) to the default mode 520 (i.e., waveform 600), the intensity of illumination generated by the illumination source 110 decreases as a result of reducing the percentage of time during which the illumination source 110 is on (i.e., by decreasing the duty cycle of the illumination waveform). Conversely, when the optical code reader 400 transitions from the default mode 520 (i.e., waveform 600) to the detected-object mode 510 (i.e., waveform 620), the intensity of illumination generated by the illumination source 110 increases as a result of increasing the percentage of time during which the illumination source 110 is on (i.e., by increasing the duty cycle of the illumination waveform).

Increasing the intensity of illumination generated by the illumination source 110 increases the depth of field of the optical code reader 400 and decreasing the intensity of illumination generated by the illumination source 110 decreases the depth of field of the optical code reader 400. For example, the optical code reader 400 may have a depth of field of approximately five inches when operating in the default mode 520 if the electrical pulses 602-610 of waveform 600 have a pulse width of 70 μsec that is generated at a frequency of 60 hertz (Hz). When the optical code reader 400 transitions to the detected-object mode 510, the depth of field may increase to approximately eight inches assuming the electrical pulses 622-630 of waveform 620 have a pulse width of 140 μsec that is generated at a frequency of 60 Hz.

According to certain embodiments, the pulse widths, the frequencies, or the pulse widths and the frequencies of waveforms 600 and 620 are programmable. In addition, the pulse widths, the frequencies, or the pulse widths and the frequencies of waveforms 600 and 620 vary from one pulse to another pulse, according to certain embodiments. According to one embodiment, the illumination source 110 that is driven with the illumination-driving waveforms 600 and 620 comprises one or more LEDs configured to illuminate the scan volume 420 with light having a wavelength within a wavelength band of approximately 620 nm to approximately 750 nm (referred to herein as red light), and preferably approximately 632 nm. According to another embodiment, the illumination source 110 that is driven with the illumination-driving waveforms 600 and 620 comprises one or more LEDs configured to illuminate the scan volume 420 with light having a wavelength within a wavelength band of approximately 380 nm to approximately 750 nm (referred to herein as white light). According to another embodiment, the illumination source 110 that is driven with the illumination-driving waveforms 600 and 620 comprises one or more LEDs configured to illuminate the scan volume 420 with light having a wavelength within a wavelength band of approximately 750 nm to approximately 300 μm (referred to herein as infrared light), and preferably approximately 850 nm.

Figure 7:
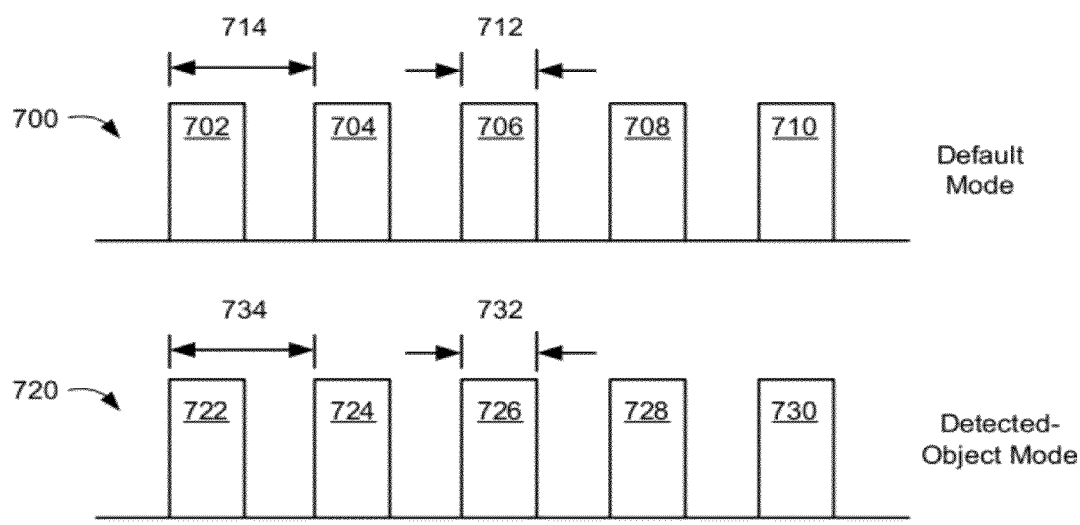

FIG. 7 illustrates illumination-driving waveforms 700 and 720 that are used to drive illumination source 110, according to another embodiment. In the embodiment described with reference to FIG. 7, the illumination source 110 comprises one or more infrared LEDs and one or more red LEDs. Alternatively, the illumination source 110 comprises one or more infrared LEDs and one or more white LEDs. When the optical code reader 400 is operating in the default mode 520, the infrared LEDs remain off while the red LEDs, the white LEDs, or both the red and white LEDs, illuminate the scan volume 420. When the optical code reader 400 transitions to the detected-object mode 510, the infrared LEDs are turned on along with the red and/or white LEDs.

In other words, the illumination driver 130 drives the red and/or white LEDs with an illumination-driving waveform 700 (but does not drive the infrared LEDs) when the optical code reader 400 is operating in the default mode 520. When the optical code reader 400 transitions to the detected-object mode 510, the illumination driver 130 drives both the infrared LEDs and the red/white LEDs with an illumination-driving waveform 720. In an alternative embodiment, the infrared LEDs and the red/white LEDs are driven with illumination-driving waveforms having different pulse widths and possibly different frequencies (e.g., the infrared LEDs may be driven with a waveform having a 100% duty cycle while the red and/or white LEDs are driven with the illumination-driving waveform 720). The illumination-driving waveform 700 includes electrical pulses 702, 704, 706, 708, and 710, each of which has a fixed pulse width 712 that is generated at a predetermined frequency 714. In a similar vein, the illumination-driving waveform 720 includes electrical pulses 722, 724, 726, 728, and 730, each of which has a fixed pulse width 732 that is generated at a predetermined frequency 734. The height of each pulse corresponds to the drive current (e.g., LED drive current).

Turning on the infrared LEDs increases the depth of field of the optical code reader 400 while turning off the infrared LEDs decreases the depth of field of the optical code reader 400. For example, the optical code reader 400 may have a depth of field of approximately four inches when operating in the default mode 520 if the electrical pulses 702-710 of waveform 700 (which are driving the red and/or white LEDs) have a pulse width of 140 μsec that is generated at a frequency of 60 Hz. When the optical code reader 400 transitions to the detected-object mode 510 and turns on the infrared LEDs, the depth of field may increase to approximately six to approximately eight inches. In other words, even though the electrical pulses 722-730 of waveform 720 have a pulse width and frequency that are similar or identical to that of waveform 700 (e.g., a pulse width of 140 μsec that is generated at a frequency of 60 Hz), the depth of field of the optical code reader 400 is increased by adding the infrared illumination.

According to certain embodiments, the pulse widths, the frequencies, or the pulse widths and the frequencies of waveforms 700 and 720 are programmable. In addition, the pulse widths, the frequencies, or the pulse widths and the frequencies of waveforms 700 and 720 may be controlled to vary from one pulse to another pulse. The infrared LEDs are preferably configured to illuminate the scan volume 420 with infrared light. The red LEDs are configured to illuminate the scan volume 420 with red light. The white LEDs are configured to illuminate the scan volume 420 with white light.

Figure 8A:
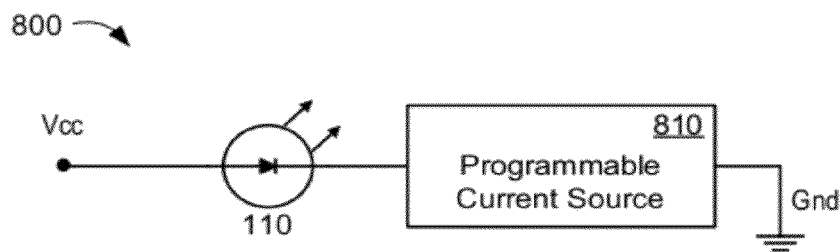
FIGS. 8A and 8B are schematic diagrams of intensity control circuits for illumination sources, according to various embodiments.

FIG. 8A is a schematic block diagram of an intensity control circuit 800 for the illumination source 110, according to one embodiment. Instead of, or in addition to, changing a pulse width of a driving waveform when the optical code reader 400 transitions between the detected-object mode 510 and the default mode 520, the amount of current used to drive the illumination source 110 is increased or decreased in the embodiment described with reference to FIG. 8A. Increasing the amount of drive current increases the depth of field of the optical code reader 400 while decreasing the amount of drive current decreases the depth of field of the optical code reader 400. Both a pulse width of a driving waveform and the amount of current used to drive the illumination source 110 may be set to a given level when the optical code reader 400 transitions between the detected-object mode 510 and the default mode 520.

The intensity control circuit 800 includes a programmable current source 810 to control the amount of current supplied to the illumination source 110. The programmable current source 810 is preferably in communication with the controller 140 (e.g., via bus 150) so that the controller 140 can adjust the optical output of the illumination source 110 when the optical code reader 400 transitions between the detected-object mode 510 and the default mode 520. The programmable current source 810 may be implemented in a number of different ways. For example, the programmable current source 810 may include a plurality of resistors connected in parallel with one another, the resistors being configured to be switched into and out of the circuit (e.g., via transistors, the gates of which may be coupled to the controller 140) to change the total resistance between the illumination source 110 and ground. By changing the resistance, the total current that drives illumination source 110 also changes. Thus, the controller 140 can increase or decrease the intensity of illumination generated by the illumination source 110 by switching resistors in and out of the circuit. Other embodiments of the programmable current source 810 may be implemented by skilled persons.

Figure 8B:
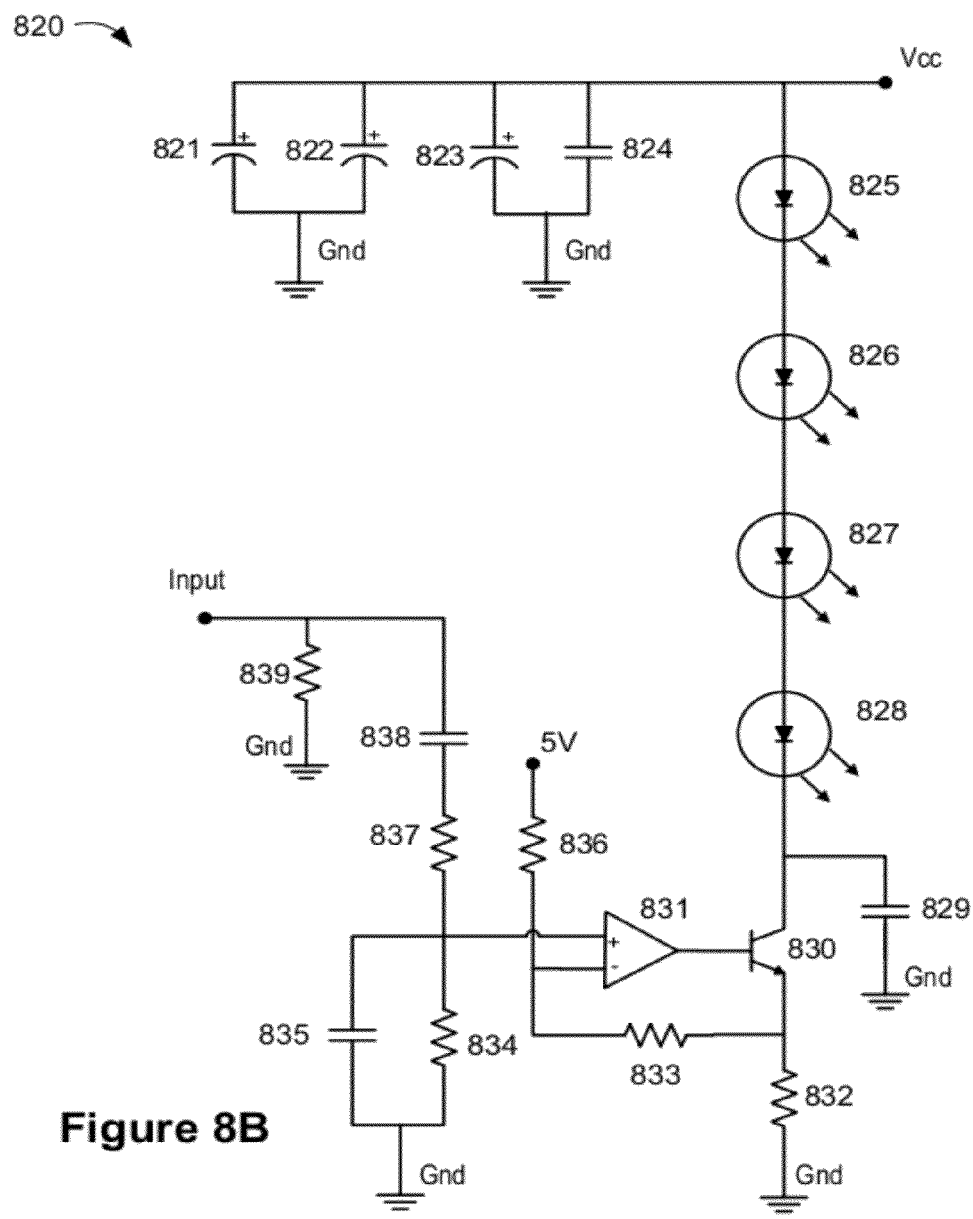

FIG. 8B is a schematic block diagram of an intensity control circuit 820 for illumination sources 825, 826, 827, and 828, according to one embodiment. The illumination sources 825-828 may be similar or identical to the illumination source 110. The controller 140 (FIG. 1) may be coupled to the input of the drive circuit 820 so that the controller 140 can adjust the optical output of the illumination sources 825-828 when the optical code reader 400 transitions between the detected-object mode 510 and the default mode 520. As illustrated in FIG. 8B, a resistor 839 (e.g., a 100 kΩ resistor) is connected between the input of the drive circuit 820 and ground. A capacitor 838 (e.g., a 0.047 μF capacitor) and a resistor 838 (e.g., a 22.1 kΩ resistor) are connected in series between the input of the drive circuit 820 and the non-inverting input of an operational amplifier comparator 831. A capacitor 835 (e.g., a 330 pF capacitor) and a resistor 834 (e.g., a 10 kΩ resistor) are connected in parallel between the non-inverting input of the comparator 831 and ground. The inverting input of the comparator 831 is connected to a voltage source (e.g., a 5 volt source) through a resistor 836 (e.g., a 10 kΩ resistor). The output of the comparator 831 is connected to the base of a transistor 830 (e.g., a BJT NPN type transistor). A resistor 833 (e.g., a 100Ω resistor) is connected between the inverting input of the comparator 831 and the emitter of the transistor 830. A resistor 832 (e.g., a 1Ω resistor) is connected between the emitter of the transistor 830 and ground and a capacitor 829 (e.g., a 470 pF capacitor) is connected between the collector of the transistor 830 and ground. The illumination sources 825-828 are connected between a voltage source (Vcc) and the collector of the transistor 830. Capacitors 821 (e.g., a 220 μF polarized capacitor), 822 (e.g., a 220 μF polarized capacitor), 823 (e.g., a 1 μF polarized capacitor), and 824 (e.g., a 150 pF capacitor) are connected between the voltage source (Vcc) and ground. One or more of the resistors 834 and 837 preferably comprise programmable resistors so that the drive current provided to the illumination sources 825-828 can be programmed and changed by the controller 140 (FIG. 1). One suitable programmable resistor is the model AD5246 128-position I²C-compatible digital resistor offered by Analog Devices, Norwood, Mass., for example.

Thus, as described with reference to FIGS. 6, 7, and 8A, changing the optical output of the illumination source 110 when the optical code reader 400 switches between the detected-object mode 510 and the default mode 520 may involve one or more of: changing a pulse width of a driving waveform, changing an amount of current used to drive the illumination source 110, and changing an amount of infrared light projected into the scan volume 420 by the illumination source 110.

Referring again to FIG. 5, according to one embodiment, the default trigger comprises the absence of an object within the scan volume 420 (or failure to detect an object within the scan volume 420) and the object trigger comprises the presence of an object within the scan volume 420 (or the detection of an object within the scan volume 420). The absence or presence of an object within the scan volume 420 may be determined in a number of ways. According to one embodiment, the absence or presence of an object is determined by comparing the brightness of an image to a predetermined threshold. Various examples of comparing the brightness of an image to a predetermined threshold in order to determine whether or not an object is in the scan volume 420 will be described in more detail with reference to FIGS. 13A to 15. According to another embodiment, the absence or presence of an object is determined by processing image data associated with the scan volume 420 for decodable data corresponding to an optical code. In other words, if there is no decodable data corresponding to an optical code, it may be assumed that there is no object within the scan volume 420. Various examples of searching for decodable data corresponding to an optical code to determine whether or not an object is in the scan volume 420 will be described in more detail with reference to FIGS. 13A and 14.

According to still another embodiment the absence or presence of an object is determined by comparing one image frame to another image frame (e.g., the next sequential image frame) to determine whether there are any changes (e.g., object motion) indicative of the absence or presence of an object within the scan volume 420. Various examples of comparing one image frame to another image frame to determine whether or not an object is in the scan volume 420 will be described in more detail with reference to FIGS. 13A and 14. According to yet another embodiment, a distinct device (e.g., a separate device other than the imager), such as a motion detector or rangefinder, is used to determine the absence or presence of an object within the scan volume 420. For example, the motion detector may include a motion sensor (e.g., an infrared sensor, ultrasonic sensor, or microwave sensor) that transforms a detection of motion into an electric signal by measuring, for example, optical or acoustical changes in the scan volume 420.

According to one embodiment, the detected-object mode 510, the default mode 520, or both the detected-object mode 510 and the default mode 520, are configurable by the user. For example, the optical output produced by the illumination source 110 when the optical code reader 400 is operating in the detected-object mode 510 is preferably programmable or configurable by the user. Likewise, the optical output produced by the illumination source 110 when the optical code reader 400 is operating in the default mode 520 is also preferably programmable or configurable by the user. Because the optical output produced by the illumination source 110 at least partially defines a depth of field of the optical code reader 400, adjusting the optical output of the illumination source 110 allows the depth of field of the optical code reader 400 to be tailored to a particular use case.

The configurable nature of the detected-object mode 510 and/or the default mode 520 is, for example, accomplished by associating with the detected-object mode 510 and/or the default mode 520 one or more user-configurable parameters that at least partially define a depth of field of the optical code reader 400 when the illumination source 110 illuminates the scan volume 420 and the optical code reader 400 is operating in the detected-object mode 510 or the default mode 520. According to one embodiment, the user-configurable parameter associated with the detected-object mode 510 and/or the default mode 520 comprises the pulse width of a driving waveform (see, e.g., FIG. 6). In other words, the user is able to program or configure the pulse width 612 associated with the default mode 520 and the pulse width 632 associated with the detected-object mode 510.

According to another embodiment, the user-configurable parameter associated with the detected-object mode 510 and/or the default mode 520 comprises an amount of current used to drive the illumination source 110. In other words, the user is able to program or configure the amount of current used to drive the illumination source 110 when the optical code reader 400 operates in the default mode 520 and the amount of current used to drive the illumination source 110 when the optical code reader 400 operates the detected-object mode 510. According to still another embodiment, the user-configurable parameter associated with the detected-object mode 510 and/or the default mode 520 comprises the pulse width of a driving waveform and an amount of current used to drive the illumination source 110.

According to yet another embodiment, the user-configurable parameter associated with the detected-object mode 510 and/or the default mode 520 comprises an amount of infrared light projected into the scan volume 420 by the illumination source 110. In other words, the user is able to program or configure the pulse width of the waveform that drives the infrared LEDs when the optical code reader 400 operates in the detected-object mode 510 (e.g., the pulse width 732 associated with the detected-object mode 510). In addition, or alternatively, the user is able to program or configure the amount of current used to drive the infrared LEDs when the optical code reader 400 operates in the detected-object mode 510.

The programmable illumination settings (e.g., the user-configurable parameters) associated with the detected-object mode 510 and/or the default mode 520 may be configured or programmed based on the use case. For example, the user may set the illumination settings to optimize the visual effect for the user (e.g., set the illumination source to a relative dim intensity level if the user uses the optical code reader 400 while sitting). By way of another example, the user may set the illumination settings to maintain a comfortable sweep speed (e.g., how fast an optical code can be swept through the scan volume with a relatively high probability of a successful scan/read). By way of still another example, the user may set the illumination settings to maintain the first pass read rate (e.g., the likelihood that an optical code will be read during the first pass after being presented to the optical code reader 400).

Table 1 presents various use case examples for the programmable illumination settings (e.g., the user-configurable parameters) associated with the detected-object mode 510 and the default mode 520. For example, the user may set the illumination setting associated with the detected-object mode 510 and the default mode 520 to an always bright use case, which causes the optical code reader 400 to have a relatively long depth of field (DOF), such as eight inches, in both the detected-object mode 510 and the default mode 520. In other words, the illumination source 110 may be driven with the illumination-driving waveform 620 (FIG. 6) or the illumination-driving waveform 720 (FIG. 7). If, for example, the illumination source 110 is driven with a waveform having relatively wide pulse widths (e.g., waveform 620 of FIG. 6) in the always bright use case, the optical code reader 400 will have a relatively long depth of field and a relatively slow sweep speed, and the illumination source 110 will be relatively bright. Thus, the always bright use case may be used when the user is using the optical code reader 400 while standing.

By way of another example, the user may set the illumination setting associated with the detected-object mode 510 and the default mode 520 to an always dim use case, which causes the optical code reader 400 to have a relatively short depth of field, such as four inches, in both the detected-object mode 510 and the default mode 520. In other words, the illumination source 110 may be driven with the illumination-driving waveform 600 (FIG. 6) or the illumination-driving waveform 700 (FIG. 7). If, for example, the illumination source 110 is driven with a waveform having relatively narrow pulse widths (e.g., waveform 600 of FIG. 6) in the always dim use case, the optical code reader 400 will consume less power, have a relatively short depth of field, and have a relatively fast sweep speed, and the illumination source 110 will be relatively dim.

In general, the narrower the pulse width of the illumination-driving waveform, the greater the sweep speed will be due to a decrease in the amount of blur. For example, assuming that it is desirable to accommodate a sweep speed of 100 inches per second for an object through the scan volume 420, and further assuming that the minimum feature size for an optical code is 10 mil, then the duration of an illumination pulse should be no more than 100 µs, to ensure that the optical blur during the exposure time is no more than the width of the smallest element of the optical code. The amount of current driving the LEDs can be set based on the duty cycle of the LEDs and their maximum current rating. If the LEDs are pulsed near their maximum allowable pulse current, the LED pulse width can be minimized to thereby maximize the sweep speed.

TABLE 1

|  |  | Detected-Object Mode 510 | | |
|---|---|---|---|---|
|  |  | Long DOF | Medium DOF | Short DOF |
| Default Mode 520 | Long DOF | 8 | N/A | N/A |
|  | Medium DOF | 1st Frame: 6<br>2nd Frame and After: 8 | 6 | N/A |
|  | Short DOF | 1st Frame: 4<br>2nd Frame and After: 8 | 1st Frame: 4<br>2nd Frame and After: 6 | 4 |

By way of yet another example, the user may set the illumination setting associated with the detected-object mode 510 and the default mode 520 to an always medium intensity use case, which causes the optical code reader 400 to have a depth of field between the long and short depths of field, such as six inches, in both the detected-object mode 510 and the default mode 520.

For the always bright use case, the always dim use case, and the always medium intensity use case (the diagonal settings of Table 1), the depth of field of the optical code reader 400 (and the perceived intensity of the illumination source 100) does not change when the optical code reader 400 switches between the detected-object mode 510 and the default mode 520. In certain use cases, it may be desirable to change the depth of field of the optical code reader 400 when the optical code reader 400 switches between the detected-object mode 510 and the default mode 520 (e.g., based on whether an object is within the scan volume 420).

For example, the user may set the illumination setting associated with the default mode 520 to a relatively short depth of field, such as four inches, and the illumination setting associated with the detected-object mode 510 to a relatively long depth of field, such as eight inches. Thus, the optical code reader 400 will have a relatively short depth of field until an object, such as an optical code, is detected within the scan volume 420 and the optical code reader 400 switches to the detected-object mode 510. After the optical code reader 400 is operating in the detected-object mode 510, the optical code reader 400 will have a relatively long depth of field until the object is no longer within the scan volume 420. Thus, the optical code reader 400 will have a relatively short depth of field, such as four inches, for the first image frame and a relatively long depth of field, such as eight inches, for the second and subsequent image frames. Configuring the optical code reader 400 to have a relatively short depth of field in the default mode 520 and a relatively long depth of field in the detected-object mode 510 allows the optical code reader 400 to have a relatively long depth of field, such as eight inches, for the second and subsequent image frames and a fast sweep speed in the near field, and the illumination source 110 will be relatively dim (when in the default mode 520).

Figure 9:
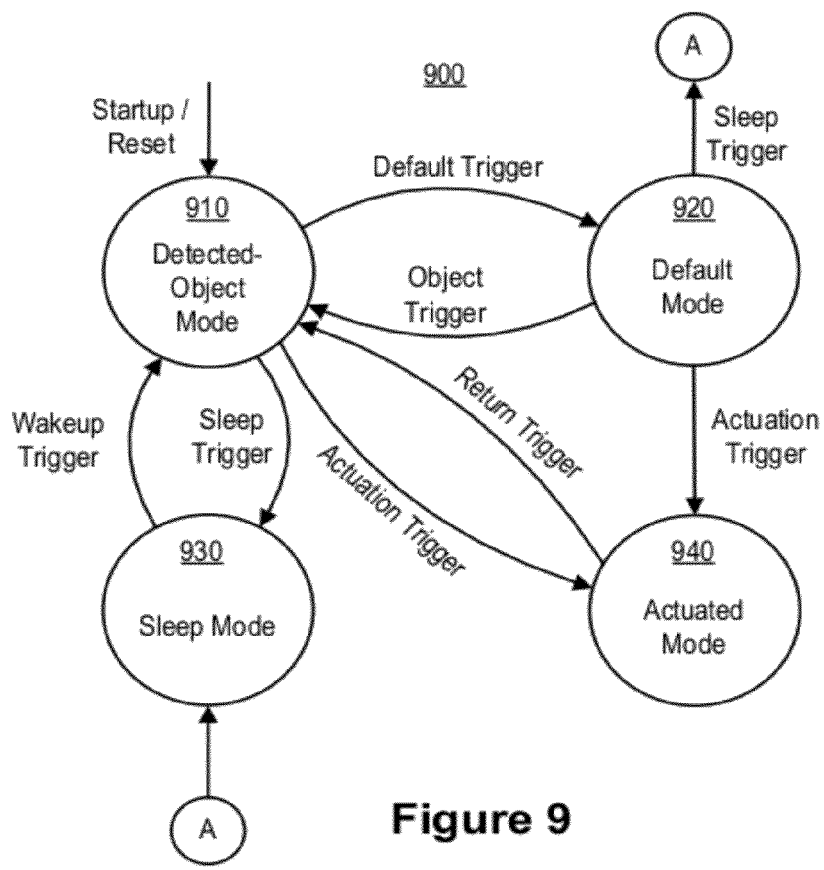
FIG. 9 is a simplified state diagram illustrating four illumination modes of an optical code reader, according to one embodiment.

FIG. 9 is a simplified state diagram 900 illustrating four illumination modes of the optical code reader 400, according to one embodiment. In particular, the state diagram 900 illustrates a detected-object mode 910, a default mode 920, a sleep mode 930, and an actuated mode 940. The detected-object mode 910 and the default mode 920 are identical to the detected-object mode 510 and the default mode 520 described with reference to FIGS. 5, 6, 7, and 8A, except that the optical code reader 400 transitions to the sleep mode 930 and the actuated mode 940 from the detected-object mode 910 and the default mode 920.

An actuation trigger causes the optical code reader 400 to transition to the actuated mode 940 from either the detected-object mode 910 or the default mode 920. The actuation trigger may comprise any number of events, such as the actuation of a trigger button or switch (e.g., the user manually depresses a trigger button or switch, which may be disposed on the housing 410 in FIG. 4), receiving a command from a host computer (e.g., host 350 in FIG. 3) or device, or decoding data associated with a special optical code, such as pick list labels (e.g., the operator may scan a particular optical code (e.g., optical code associated with an apple) from a list of optical codes (e.g., a list of optical codes associated with various fruit)). The optical code reader 400 operates in the actuated mode 940 until a return trigger causes the optical code reader 400 to transition from the actuated mode 940 to the detected-object mode 910. The return trigger comprises, for example, receiving an indication that an optical code has been read (e.g., one or more optical codes have been detected and decoded by the optical code reader 400) or an absence of an object within the scan volume 420 for a predetermined duration, such as a predetermined number of image frames or a predetermined period of time.

A sleep trigger causes the optical code reader 400 to transition to the sleep mode 930 from either the detected-object mode 910 or the default mode 920. The sleep trigger comprises an absence of an object, such as an optical code, within the scan volume 420 for a predetermined duration, such as a predetermined number of image frames or a predetermined period of time (e.g., 15 seconds to 1 hour). The optical code reader 400 operates in the sleep mode 930 until a wakeup trigger causes the optical code reader 400 to transition from the sleep mode 930 to the detected-object mode 910. The wakeup trigger may comprise the presence of an object within the scan volume 420 or a change in ambient light (e.g., a percentage change in ambient light, such as a percentage within a user selectable range of 5% to 15%). Various examples of how the optical code reader 400 determines the presence or absence of an object (e.g., an optical code) within the scan volume 420 are described with reference to FIG. 5, such as monitoring the scan volume 420 for a gray scale change caused by an object.

Figure 10:
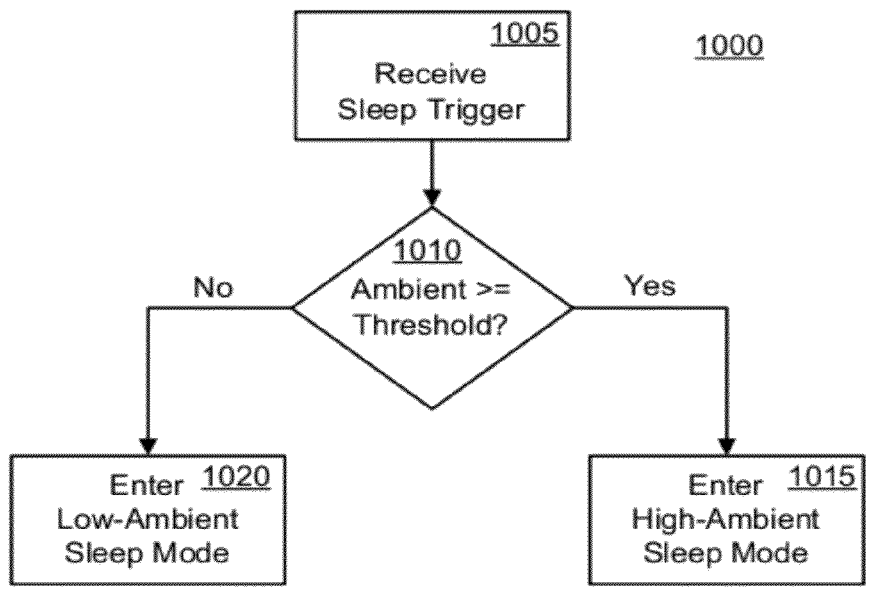
FIG. 10 is a flow chart of a method for determining whether to enter a low-ambient or high-ambient sleep mode, according to one embodiment.

According to one embodiment, there may be more than one sleep mode, such as low-ambient and high-ambient sleep modes. FIG. 10 is a flow chart of a method 1000 for determining whether to enter a low-ambient sleep mode 1020 or a high-ambient sleep mode 1015, according to one embodiment. After receiving a sleep trigger at step 1005, the optical code reader 400 determines at step 1010 whether the ambient illumination is greater than or equal to a predetermined threshold. In one configuration, out of 256 grayscale values (8-bit image data where a higher value represents a higher light intensity), the predetermined threshold value is set to a value of approximately 40. The ambient illumination may be measured via the imager 120 or a separate photosensor or photodetector. If it is determined at step 1010 that the ambient illumination is greater than or equal to the predetermined threshold, the optical code reader 400 enters the high-ambient sleep mode at step 1015 (e.g., the illumination source 110 is turned off). The high-ambient sleep mode may be useful where there is a very high ambient illumination or to save energy by turning off the illumination source 110 when there is normal ambient illumination. If, on the other hand, it is determined at step 1010 that the ambient illumination is less than the predetermined threshold, the optical code reader 400 enters the low-ambient sleep mode at step 1020 (see, e.g., waveform 1140 of FIG. 11 and waveform 1240 of FIG. 12) so that it is easier to "wake up" the optical code reader 400 (e.g., some light is projected into the scan volume to help determine the presence or absence of an object with the scan volume).

The state or mode of the illumination source 110 when the optical code reader 400 is operating in the detected-object mode 910, the default mode 920, the sleep mode 930, or the actuated mode 940 may be set in a number of ways and may depend on the type of illumination that is used. For example, changing the optical output of the illumination source 110 when the optical code reader 400 switches between the detected-object mode 910, the default mode 920, the sleep mode 930, and the actuated mode 940 may involve one or more of changing a pulse width of a driving waveform, changing an amount of current used to drive the illumination source 110, and changing an amount of infrared light projected into the scan volume 420 by the illumination source 110. Various examples of changing the optical output of the illumination source 110 when the optical code reader 400 switches between the detected-object mode 910, the default mode 920, the sleep mode 930, or the actuated mode 940 are described with reference to FIGS. 11 and 12.

Figure 11:
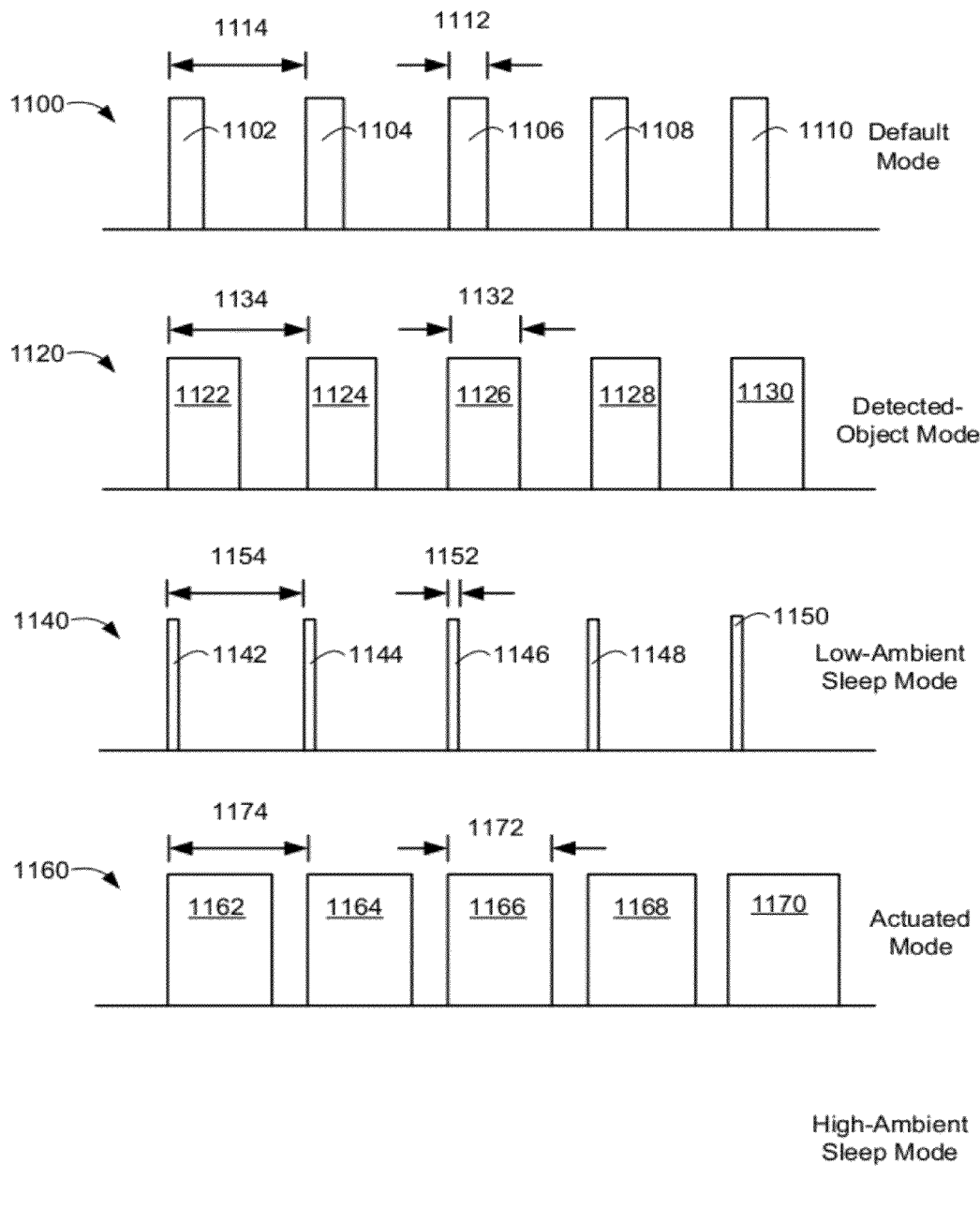
FIGS. 11 and 12 illustrate illumination-driving waveforms, according to various embodiments.

FIG. 11 illustrates illumination-driving waveforms 1100, 1120, 1140, and 1160 that are used to drive illumination source 110, according to one embodiment. For example, the illumination source may comprise one or more LEDs that are configured to illuminate the scan volume 420 with a series of illumination pulses, each of which has a pulse width. To generate the illumination pulses, an illumination driver (e.g., the illumination driver 130) drives the illumination source 110 with a waveform that includes a series of electrical pulses. With reference to FIG. 11:

the illumination driver 130 drives the illumination source 110 with an illumination-driving waveform 1100 when the optical code reader 400 is operating in the default mode 920;

the illumination driver 130 drives the illumination source 110 with an illumination-driving waveform 1120 when the optical code reader 400 is operating in the detected-object mode 910;

the illumination driver 130 drives the illumination source 110 with an illumination-driving waveform 1140 when the optical code reader 400 is operating in the low-ambient sleep mode;

the illumination driver 130 drives the illumination source 110 with an illumination-driving waveform 1160 when the optical code reader 400 is operating in the actuated mode 940; and the illumination source 110 is turned off when the optical code reader 400 is operating in the high-ambient sleep mode.

The illumination-driving waveform 1100 includes electrical pulses 1102, 1104, 1106, 1108, and 1110, each of which has a fixed pulse width 1112 that is generated at a predetermined frequency 1114. In a similar vein, the illumination-driving waveform 1120 includes electrical pulses 1122, 1124, 1126, 1128, and 1130, each of which has a fixed pulse width 1132 that is generated at a predetermined frequency 1134. The illumination-driving waveform 1140 includes electrical pulses 1142, 1144, 1146, 1148, and 1150, each of which has a fixed pulse width 1152 that is generated at a predetermined frequency 1154. The illumination-driving waveform 1160 includes electrical pulses 1162, 1164, 1166, 1168, and 1170, each of which has a fixed pulse width 1172 that is generated at a predetermined frequency 1174. The height of each pulse corresponds to the drive current (e.g., LED drive current).

In one example, the optical code reader 400 is configured with a depth of field of approximately five inches when operating in the default mode 920 if the electrical pulses 1102-1110 of waveform 1100 have a pulse width of 70 μsec that is generated at a frequency of 60 Hz. When the optical code reader 400 transitions to the detected-object mode 910, the depth of field may increase to approximately eight inches assuming the electrical pulses 1122-1130 of waveform 1120 have a pulse width of 140 μsec that is generated at a frequency of 60 Hz. When the optical code reader 400 transitions to the low-ambient sleep mode, the illumination source 110 may be driven with a waveform 1140 in which the electrical pulses 1142-1150 have a pulse width of approximately 16-30 μsec that is generated at a frequency of 60 Hz. In the low-ambient sleep mode, the optical code reader 400 monitors the scan volume for a gray scale change indicative of the presence of an object (e.g., the optical code reader 400 may not be able to read an optical code while in the low-ambient sleep mode). In other words, a small amount of light is projected into the scan volume while the optical code reader 400 is in the low-ambient sleep mode so that the optical code reader 400 is ready to "wake up" when an object enters the scan volume. When the optical code reader 400 transitions to the actuated mode 940, the depth of field may increase to approximately 8 inches, assuming the electrical pulses 1162-1170 of waveform 1160 have a pulse width of 125 μsec that is generated at a frequency of 60 Hz. The waveform 1160 is preferably configured to optimize the contrast of a captured image.

According to certain embodiments, the pulse widths, frequencies, or the pulse widths and the frequencies, of waveforms 1100-1160 are programmable. In addition, the pulse widths, the frequencies, or the pulse widths and the frequencies, of waveforms 1100-1160 vary from one pulse to another pulse, according to certain embodiments. According to one embodiment, the illumination source 110 that is driven with the illumination-driving waveforms 1100-1160 comprises one or more LEDs configured to illuminate the scan volume 420 with red light. According to another embodiment, the illumination source 110 that is driven with the illumination-driving waveforms 1100-1160 comprises one or more LEDs configured to illuminate the scan volume 420 with white light.

Figure 12:
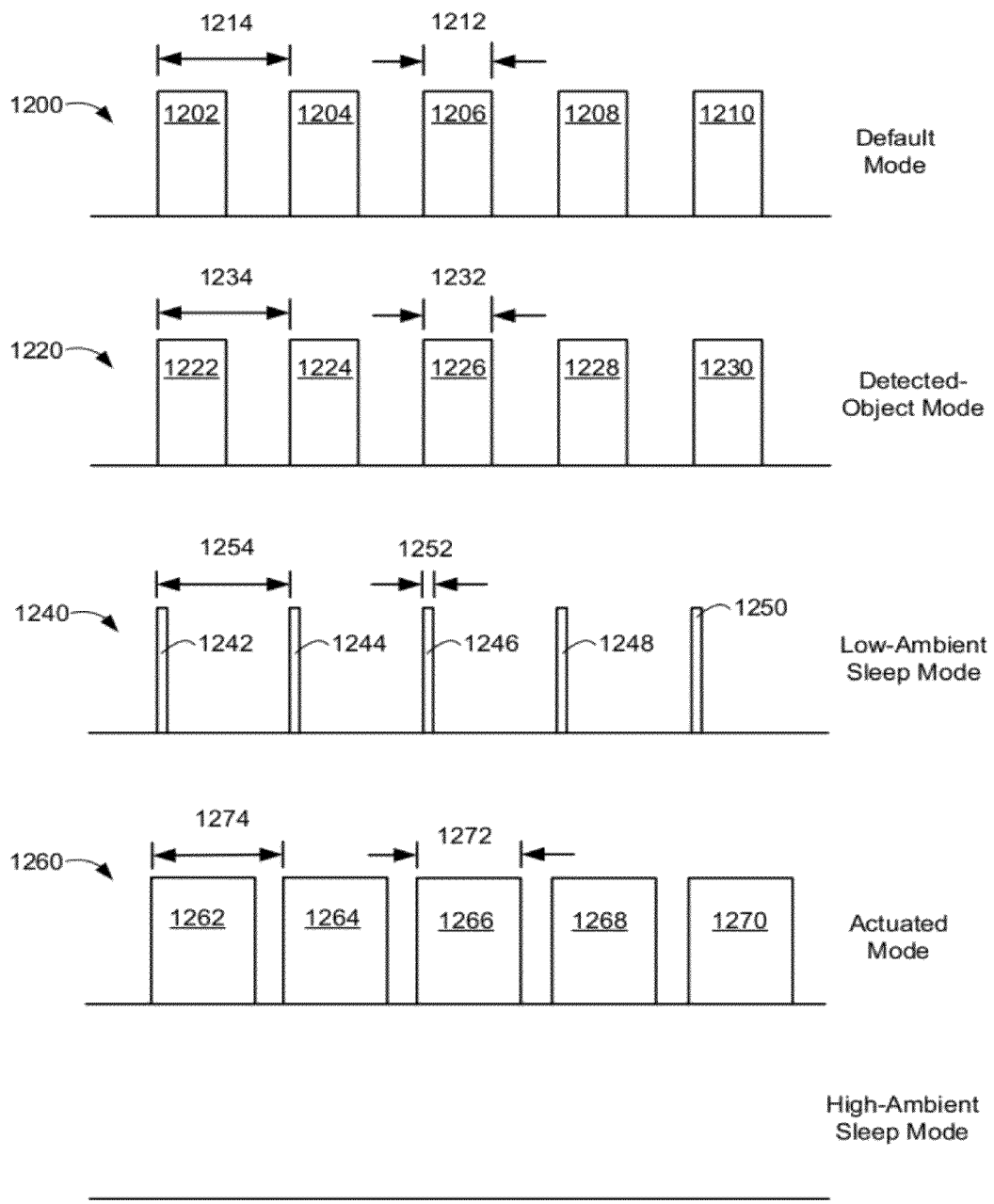

FIG. 12 illustrates illumination-driving waveforms 1200, 1220, 1240, and 1260 that are used to drive illumination source 110, according to another embodiment. In the embodiment described with reference to FIG. 12, the illumination source 110 comprises one or more infrared LEDs and one or more red LEDs. Alternatively, the illumination source 110 comprises one or more infrared LEDs and one or more white LEDs. When the optical code reader 400 is operating in the default mode 920, the infrared LEDs remain off while the red LEDs, the white LEDs, or both the red and white LEDs, illuminate the scan volume 420. When the optical code reader 400 transitions to the detected-object mode 910, the infrared LEDs are turned on along with the red and/or white LEDs. When the optical code reader 400 transitions to the low-ambient sleep mode, the infrared LEDs are turned on and the red and/or white LEDs are turned off. When the optical code reader 400 transitions to the actuated mode 940, the infrared LEDs are turned on along with the red and/or white LEDs.

In other words, the illumination driver 130 drives the red and/or white LEDs with an illumination-driving waveform 1200 (but does not drive the infrared LEDs) when the optical code reader 400 is operating in the default mode 920. When the optical code reader 400 transitions to the low-ambient sleep mode, the illumination driver 130 drives the infrared LEDs with an illumination-driving waveform 1240 (but does not drive the red/white LEDs). When the optical code reader 400 transitions to the detected-object mode 910, the illumination driver 130 drives both the infrared LEDs and the red/white LEDs with an illumination-driving waveform 1220. When the optical code reader 400 transitions to the actuated mode 940, the illumination driver 130 drives both the infrared LEDs and the red/white LEDs with an illumination-driving waveform 1260. In alternative embodiments, when the optical code reader 400 transitions to the detected-object mode 910 or the actuated mode 940, the infrared LEDs and the red/white LEDs may be driven with illumination-driving waveforms having different pulse widths and possibly different frequencies (e.g., the infrared LEDs may be driven with a waveform having a 100% duty cycle while the red and/or white LEDs are driven with the illumination-driving waveform 1220).

The illumination-driving waveform 1200 includes electrical pulses 1202, 1204, 1206, 1208, and 1210, each of which has a fixed pulse width 1212 that is generated at a predetermined frequency 1214. In a similar vein, the illumination-driving waveform 1220 includes electrical pulses 1222, 1224, 1226, 1228, and 1230, each of which has a fixed pulse width 1232 that is generated at a predetermined frequency 1234. The illumination-driving waveform 1240 includes electrical pulses 1242, 1244, 1246, 1248, and 1250, each of which has a fixed pulse width 1252 that is generated at a predetermined frequency 1254. The illumination-driving waveform 1260 includes electrical pulses 1262, 1264, 1266, 1268, and 1270, each of which has a fixed pulse width 1272 that is generated at a predetermined frequency 1274. The height of each pulse corresponds to the drive current (e.g., LED drive current).

In one example, the optical code reader 400 is configured with a depth of field of approximately four inches when operating in the default mode 920 if the electrical pulses 1202-1210 of waveform 1200 (which are driving the red and/or white LEDs) have a pulse width of 140 µsec that is generated at a frequency of 60 Hz. When the optical code reader 400 transitions to the detected-object mode 910 and turns on the infrared LEDs, the depth of field may increase to approximately six to approximately eight inches. When the optical code reader 400 transitions to the low-ambient sleep mode, the red and/or infrared LEDs may be driven with a waveform 1240 in which the electrical pulses 1242-1250 have a pulse width of approximately 30 µsec that is generated at a frequency of 60 Hz. According to one embodiment, the optical code reader 400 does not drive the white LEDs during the low-ambient sleep mode. In the low-ambient sleep mode, the optical code reader 400 monitors the scan volume for a gray scale change indicative of the presence of an object (e.g., the optical code reader 400 may not be able to read an optical code while in the low-ambient sleep mode). In other words, a small amount of light is projected into the scan volume while the optical code reader 400 is in the low-ambient sleep mode so that the optical code reader 400 is ready to "wake up" when an object enters the scan volume. When the optical code reader 400 transitions to the actuated mode 940 and drives the infrared LEDs and red/white LEDs with waveform 1260, the depth of field may increase to approximately 8 inches assuming the electrical pulses 1262-1270 of waveform 1260 have a pulse width of 125 µsec that is generated at a frequency of 60 Hz.

According to certain embodiments, the pulse widths, the frequencies, or the pulse widths and the frequencies, of waveforms 1200-1260 are programmable. In addition, the pulse widths, the frequencies, or the pulse widths and the frequencies, of waveforms 1200-1260 vary from one pulse to another pulse according to certain embodiments. The infrared LEDs are preferably configured to illuminate the scan volume 420 with infrared light. The red LEDs are configured to illuminate the scan volume 420 with red light. The white LEDs are configured to illuminate the scan volume 420 with white light.

Figure 13A:
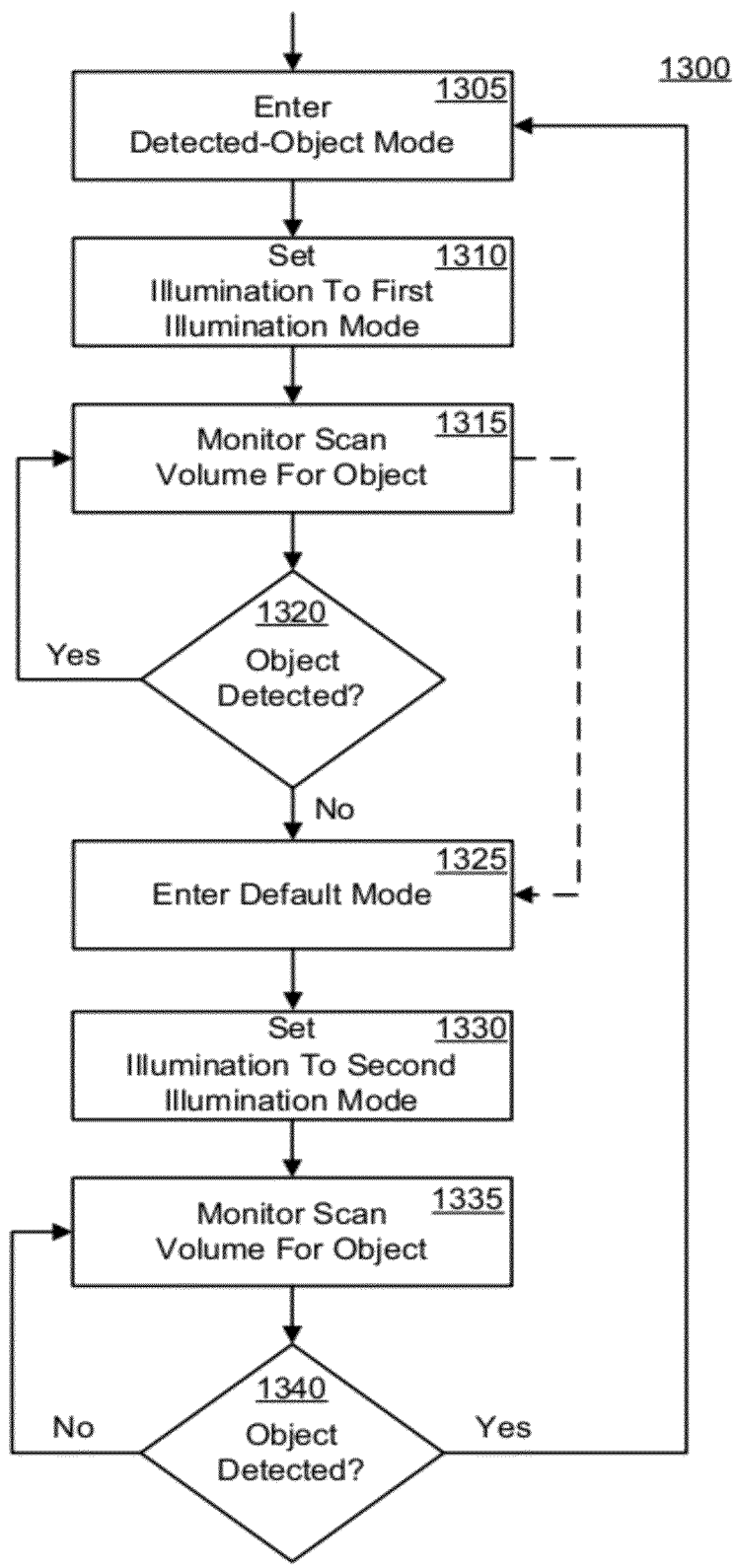
FIG. 13A is a flow chart of a method for illuminating a scan volume of an optical code reader, according to one embodiment.

FIG. 13A is a flow chart of a method 1300 for illuminating a scan volume of an optical code reader, such as the optical code reader 400, according to one embodiment. At step 1305, the optical code reader 400 enters a detected-object mode (e.g., the detected-object mode 510 or 910). For example, the optical code reader 400 may enter the detected-object mode after the optical code reader 400 starts up or is reset or from another mode of operation, such as a default mode (e.g., the default mode 520 or 920), a sleep mode (e.g., the sleep mode 930), or an actuated mode (e.g., the actuated mode 940).

After the optical code reader 400 enters the detected-object mode, an illumination source (e.g., illumination source 110) associated with the optical code reader 400 is set to a first illumination state or mode at step 1310. For example, setting the illumination source to the first illumination mode may involve one or more of setting a pulse width of a driving waveform to a first predetermined pulse width, setting an amount of current used to drive the illumination source to a first predetermined current, and setting an amount of infrared light projected by the illumination source into a scan volume of the optical code reader 400 to a first predetermined level. After the illumination source is set to the first illumination mode at step 1310, the illumination source produces an optical output that at least partially defines a first depth of field of the optical code reader 400. Various examples of setting the optical output of the illumination source when the optical code reader 400 is operating in the detected-object mode are described with reference to FIGS. 5-12.

According to one embodiment, the optical output produced by the illumination source after the illumination source is set to the first illumination mode is programmable or configurable by the user. For example, the first illumination mode may have associated therewith one or more user-configurable parameters, such as a pulse width of a driving waveform, an amount of current used to drive the illumination source, a pulse width of a driving waveform and an amount of current used to drive the illumination source, or an amount of infrared light projected by the illumination source into the scan volume of the optical code reader 400. According to one embodiment, the user-configurable parameter(s) are stored in memory 170, 182, or both (see FIG. 1). A user can modify the user-configurable parameter(s) by accessing and changing the stored parameter(s).

Figure 13B:
FIGS. 13C and 13E illustrate various example histograms associated with respective example images of FIGS. 13B and 13D.
Figure 13C:
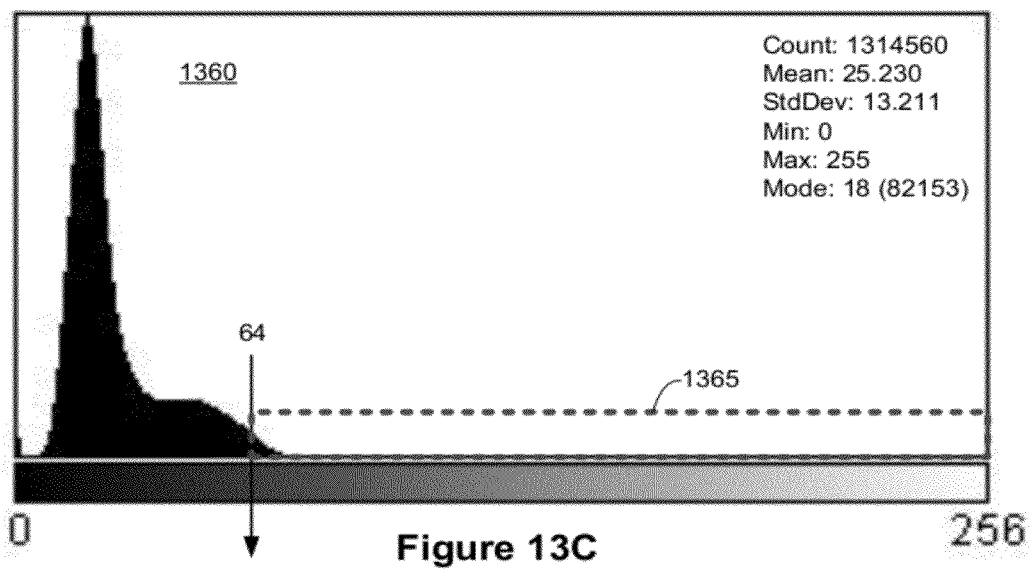
Figure 13D:

At step 1315, the optical code reader 400 monitors the scan volume for an indication of whether an object, such as an optical code, is detected in the scan volume. The absence or presence of an object within the scan volume may be determined in a number of ways. According to one embodiment, the absence or presence of an object is determined by comparing the brightness of an image (which may be adjusted by an analog gain factor) to a predetermined threshold to determine whether the image brightness is less than or equal to the predetermined threshold. If the image brightness is greater than the predetermined threshold, it is assumed that an object is within the scan volume. If, on the other hand, the image brightness is less than or equal to the predetermined threshold, it is assumed that an object is not within the scan volume. For example, FIG. 13B illustrates an image 1350 captured by an imager of the optical code reader 400 when an item or object is not within the scan volume and FIG. 13D illustrates an image 1370 captured by the imager when an object (e.g., disposable cups with an optical code thereon) is within the scan volume.

Figure 13E:
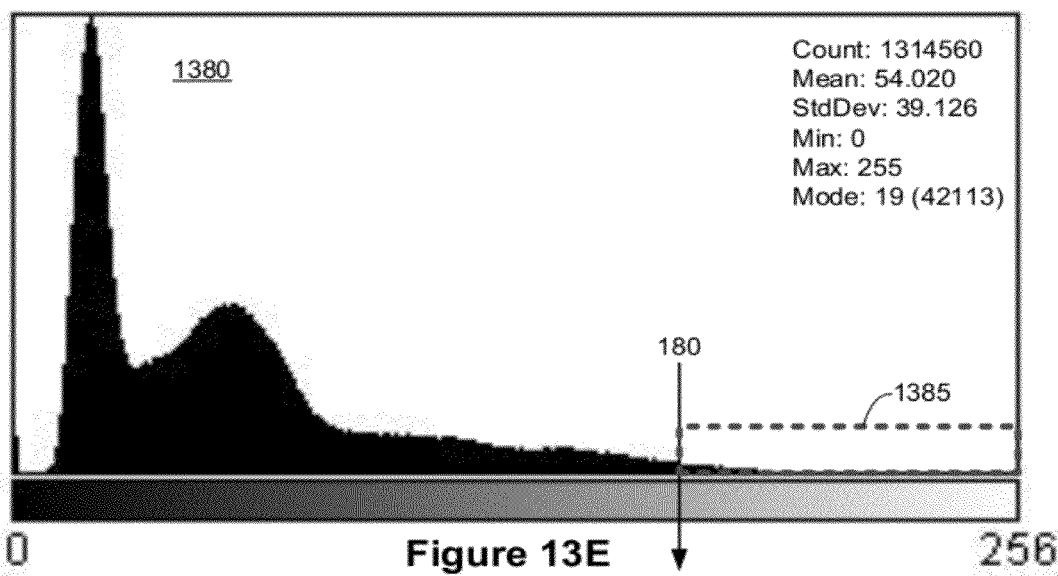

The image brightness can be compared to the predetermined threshold in a number of ways, such as using a histogram of light luminance. For example, FIG. 13C illustrates a histogram 1360 associated with the image 1350 of FIG. 13B and FIG. 13E illustrates a histogram 1380 associated with the image 1370 of FIG. 13D. The histograms 1360 and 1380 include 256 bins or buckets (ranging from 0 to 255) into which the intensity levels of the pixels in the respective images 1350 and 1370 are placed. For example, the histogram 1360 has 82,153 pixels in bin number 18. In other words, there are 82,153 pixels in the image 1350 having an intensity level of 18 (relatively dark pixels).

One manner of using a histogram of light luminance to determine whether an object is detected in the scan volume includes determining the gray scale of a current bin at a defined pixel percentage, such as 0.5%, and comparing the determined gray scale value of the current bin to the predetermined threshold. As illustrated in FIG. 13C, the gray scale value of the current bin at a defined pixel percentage of 0.5% is 64, which may be determined by summing or adding the intensity levels of pixels from highest to lowest until the number of pixels at the defined percentage is reached. For example, assuming that the imager comprises an 8-bit 1280× 1024 imager that outputs for each pixel an intensity value ranging from 0 to 255 (with 255 being a saturated bright condition) and the defined pixel percentage is set to 0.5%, the number of pixels in each bin (from brightest to darkest) are added together until a total pixel count of approximately 6,554 pixels (1280*1024*0.005) is reached. The current bin at the defined pixel percentage is the bin number having the smallest value (i.e., the intensity level of the darkest pixel out of the 6,554 pixels that have been counted), which is 64 in the histogram 1360 illustrated in FIG. 13C. In other words, there are approximately 6,554 pixels within the window 1365 (i.e., in the bins ranging from 64 to 255) and the current bin at the defined pixel percentage is the lowest bin number of the bins included in the window 1365. In the histogram 1380 illustrated in FIG. 13E, the gray scale value of the current bin at a defined pixel percentage of 0.5% is 180. In other words, there are approximately 6,554 pixels within the window 1385 and the lowest bin number is 180.

The absence or presence of an object may be inferred by comparing the gray scale value of the current bin at the defined pixel percentage to a predetermined threshold to determine whether the gray scale value is less than or equal to the predetermined threshold. For example, if the predetermined threshold is set to 90, it is assumed that an object is within an image if the gray scale value of the current bin at the defined pixel percentage is greater than 90 and it is assumed that an object is not within an image if the gray scale value of the current bin at the defined pixel percentage is less than or equal to 90. With reference to the image 1350 illustrated in FIG. 13B, it is assumed that the image 1350 does not include an object because the gray scale value of the current bin at a defined pixel percentage of 0.5% is 64, which is less than the threshold of 90. In contrast, it is assumed that the image 1370 in FIG. 13D includes an object because the gray scale value of the current bin at a defined pixel percentage of 0.5% is 180, which is greater than the threshold of 90. The gray scale values of the current bins illustrated in histograms 1360 and 1380 are contrived examples to illustrate comparing the gray scale value of the current bin to a predetermined threshold. The predetermined threshold may be set to a much lower value, such as a value within the range of approximately 35 to approximately 50.

According to another embodiment, the absence or presence of an object within the scan volume is determined by processing image data associated with the scan volume for decodable data corresponding to an optical code. For example, if there is no decodable data corresponding to an optical code, it may be assumed that there is no object within the scan volume. The optical code reader 400 can use any number of methods to search for decodable data corresponding to an optical code within the scan volume. According to one embodiment, scan data corresponding to an object, such as an optical code, located within the scan volume of the optical code reader 400 is acquired or received. The scan data may comprise source data corresponding to a scan region or read region of the optical code reader 400, such as image data or pixel data from an acquired image of the scan region or read region. In other words, the scan data represents light reflected from one or more objects (which may include an optical code) within the scan volume of the optical code reader 400. For example, one or more images of an object, such as an optical code, can be acquired after an operator positions the object within the scan volume (e.g., sweeps the object past the window or vice versa).

After the scan data is acquired or received, the scan data is processed to determine whether the acquired or received data (or any portion thereof) contains decodable data corresponding to one or more optical codes. In other words, the scan data is processed to determine whether the scan data contains any optical codes. Any suitable technique may be used to identify decodable data. For example, pixel data corresponding to one or more sub-regions (e.g., virtual scan lines) of the image is processed to locate edge transitions and to attempt to decode the pixel data based on the edge transition locations (e.g., using a low-level decoder, a high-level decoder, or both). By way of another example, a two-dimensional decoding algorithm may be used to determine whether the scan data contains decodable data corresponding to an optical code. Any suitable two-dimensional decoding algorithm may be used. Preferably, the two-dimensional decoding algorithm is configured to process the image data to identify (and optionally decode) optical codes within the acquired image. Additional details regarding two-dimensional decoding algorithms and example two-dimensional decoding algorithms can be found in international standards associated with symbology types, such as ISO/IEC 16022:2006, entitled "Information technology—Automatic identification and data capture techniques—Data Matrix bar code symbology specification", available from the International Organization for Standardization (ISO) or Geneva, Switzerland.

According to one embodiment, the scan data is not decoded at step 1315. For example, the scan data may be processed to determine whether the scan data contains or is likely to contain decodable data, such as when the relative locations of edge transitions and spaces there between yield at least one valid character, codeword, or overhead character, or when a minimum number of edge transitions are detected. According to another embodiment, the scan data is decoded at step 1315 using a suitable decoder. A reading loop in which the optical code reader 400 attempts to decode optical codes within the scan volume of the optical code reader 400 is formed by performing steps 1315 and 1320 multiple times. According to one embodiment, after the illumination source is set to the first illumination mode at step 1310, the optical output of the illumination source is not changed or altered by the optical code reader 400 during the reading loop formed by performing steps 1315 and 1320 multiple times. Rather, the optical code reader 400 changes the optical output of the illumination source at step 1330 (e.g., after an object is not detected in the scan volume and the optical code reader 400 exits the reading loop formed by performing steps 1315 and 1320 multiple times). If the scan data is decoded at step 1315 and it is determined that an optical code has been read (e.g., one or more optical codes have been detected and decoded by the optical code reader 400) the method 1300 may proceed directly from step 1315 to step 1325.

According to still another embodiment, the absence or presence of an object is determined by comparing one image frame to another image frame (e.g., the next sequential image frame) to determine whether there are any changes indicative of the absence or presence of an object within the scan volume (e.g., if an object moved from one image to the next). For example, the gray scale value above a certain percentage of pixels, such as 0.5% of one image frame (or a portion thereof) may be compared to another image frame (or a corresponding portion thereof). Based on the comparison, it can be determined whether there are any changes indicative of the absence or presence of an object within the scan volume. For example, the optical code reader 400 (e.g., a processor associated with the optical code reader 400) may, for the images to be compared, take the sum of absolute differences between all or a portion of the pixels that have a value above a predetermined threshold, such as 40 for an 8-bit imager. In other words, the optical code reader 400 may sum the differences to derive a metric of similarity between the images. If the images are similar, the sum of absolute differences will be small. However, if the images are different (e.g., due to an object appearing or disappearing or moving), the sum of absolute differences will reflect the differences between the images. Thus, the optical code reader 400 may determine that an object is (or is not) within the scan volume if the sum of absolute differences calculation exceeds a certain threshold within operational tolerances (e.g., a certain percentage difference, such as 15% to 20%).

According to yet another embodiment, a distinct device (e.g., a separate device other than the imager), such as a motion detector or rangefinder, is used to determine the absence or presence of an object within the scan volume. For example, the motion detector may include a motion sensor (e.g., an infrared sensor, ultrasonic sensor, or microwave sensor) that transforms a detection of motion into an electric signal by measuring, for example, optical or acoustical changes in the scan volume.

If an object is detected in the scan volume, the optical code reader 400 continues to monitor the scan volume for an indication of whether an object, such as an optical code, is detected in the scan volume (step 1320). If, on the other hand, an object is not detected in the scan volume (step 1320), the optical code reader 400 automatically transitions to the default mode (step 1325). In other words, the optical code reader 400 transitions to the default mode without user input or interaction (e.g., without manual human intervention or activity).

After the optical code reader 400 enters the default mode, the illumination source associated with the optical code reader 400 is set to a second illumination state or mode at step 1330. For example, setting the illumination source to the second illumination mode may involve one or more of setting a pulse width of a driving waveform to a second predetermined pulse width, setting an amount of current used to drive the illumination source to a second predetermined current, and setting an amount of infrared light projected by the illumination source into a scan volume of the optical code reader 400 to a second predetermined level. After the illumination source is set to the second illumination mode at step 1330, the illumination source produces a second optical output, which preferably decreases the depth of field of the optical code reader 400 from the first depth of field to a second depth of field that is less than the first depth of field. Various examples of setting the optical output of the illumination source when the optical code reader 400 is operating in the default mode are described with reference to FIGS. 5-12.

According to one embodiment, the optical output produced by the illumination source after the illumination source is set to the second illumination mode is programmable or configurable by the user. For example, the second illumination mode may have associated therewith one or more user-configurable parameters, such as a pulse width of a driving waveform, an amount of current used to drive the illumination source, both a pulse width of a driving waveform and an amount of current used to drive the illumination source, or an amount of infrared light projected by the illumination source into the scan volume of the optical code reader 400. According to one embodiment, the user-configurable parameter(s) are stored in memory 170, 182, or both (see FIG. 1). A user can modify the user-configurable parameter(s) by accessing and changing the stored parameter(s).

At step 1335, the optical code reader 400 monitors the scan volume for an indication of whether an object, such as an optical code, is detected in the scan volume. The absence or presence of an object within the scan volume may be determined in a manner similar or identical to that described with reference to step 1315.

If an object is not detected in the scan volume, the optical code reader 400 continues to monitor the scan volume for an indication of whether an object, such as an optical code, is detected in the scan volume (step 1340). If, on the other hand, an object is detected in the scan volume (step 1340), the optical code reader 400 automatically transitions to the detected-object mode (step 1305). In other words, the optical code reader 400 transitions to the detected-object mode without user input or interaction (e.g., without manual human intervention or activity).

Figure 14:
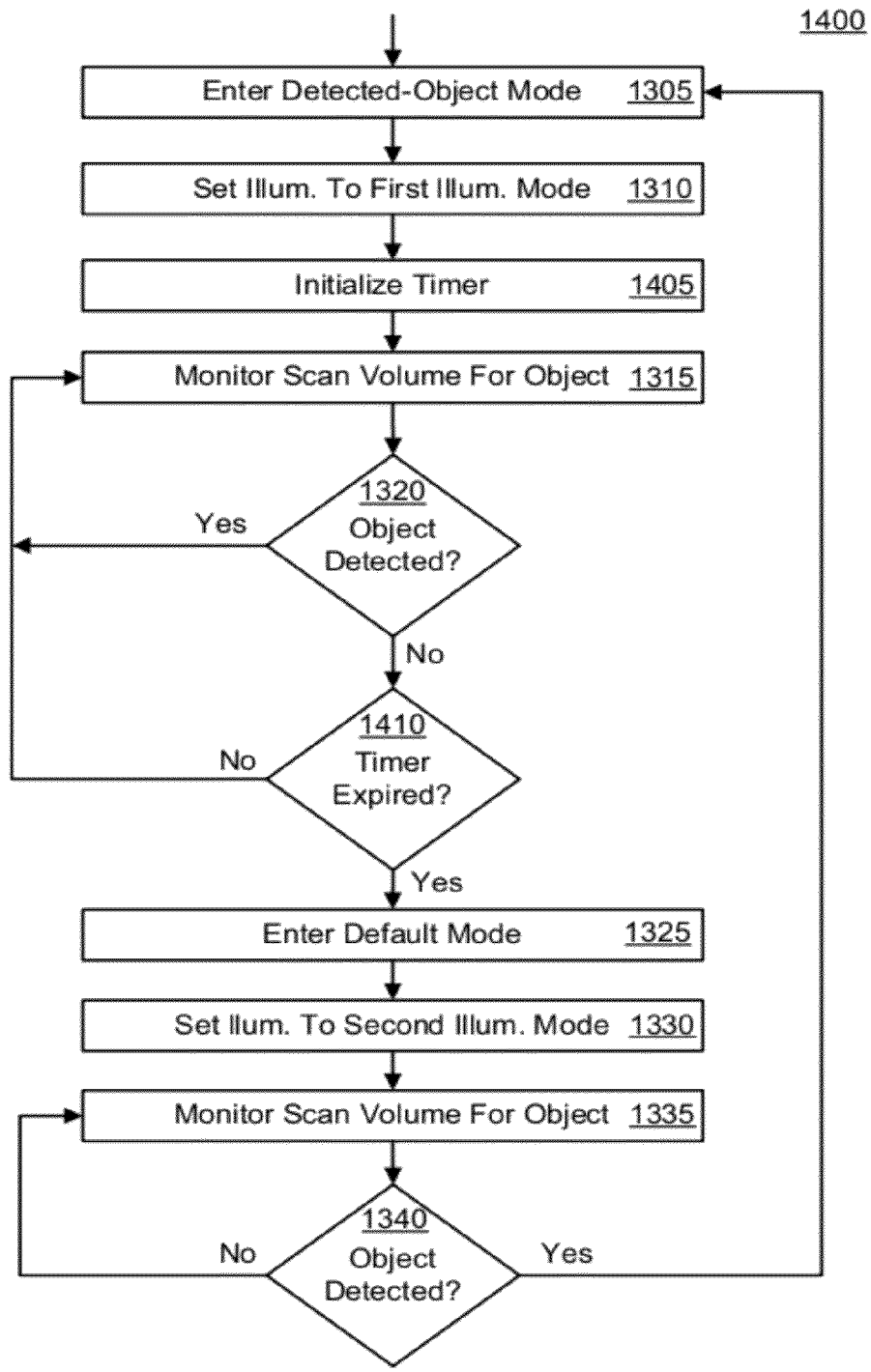
FIG. 14 is a flow chart of a method for illuminating a scan volume of an optical code reader, according to another embodiment.

FIG. 14 is a flowchart of a method 1400 that substantially mirrors the method 1300. In addition to the method 1300 described with reference to FIG. 13A, the method 1400 does not enter the default mode (step 1325) unless an object, such as an optical code, is not within the scan volume for a predetermined duration, such as a predetermined number of image frames or a predetermined period of time. After the optical code reader 400 is set to the first illumination mode at step 1310, the optical code reader 400 initializes a timer at step 1405. For example, the optical code reader 400 may set an image frame counter or a clock to a predetermined value (e.g., zero). If an object is not detected in the scan volume (step 1320), the optical code reader 400 determines whether the timer has expired (step 1410) before the optical code reader 400 automatically transitions to the default mode (step 1325).

Figure 15:
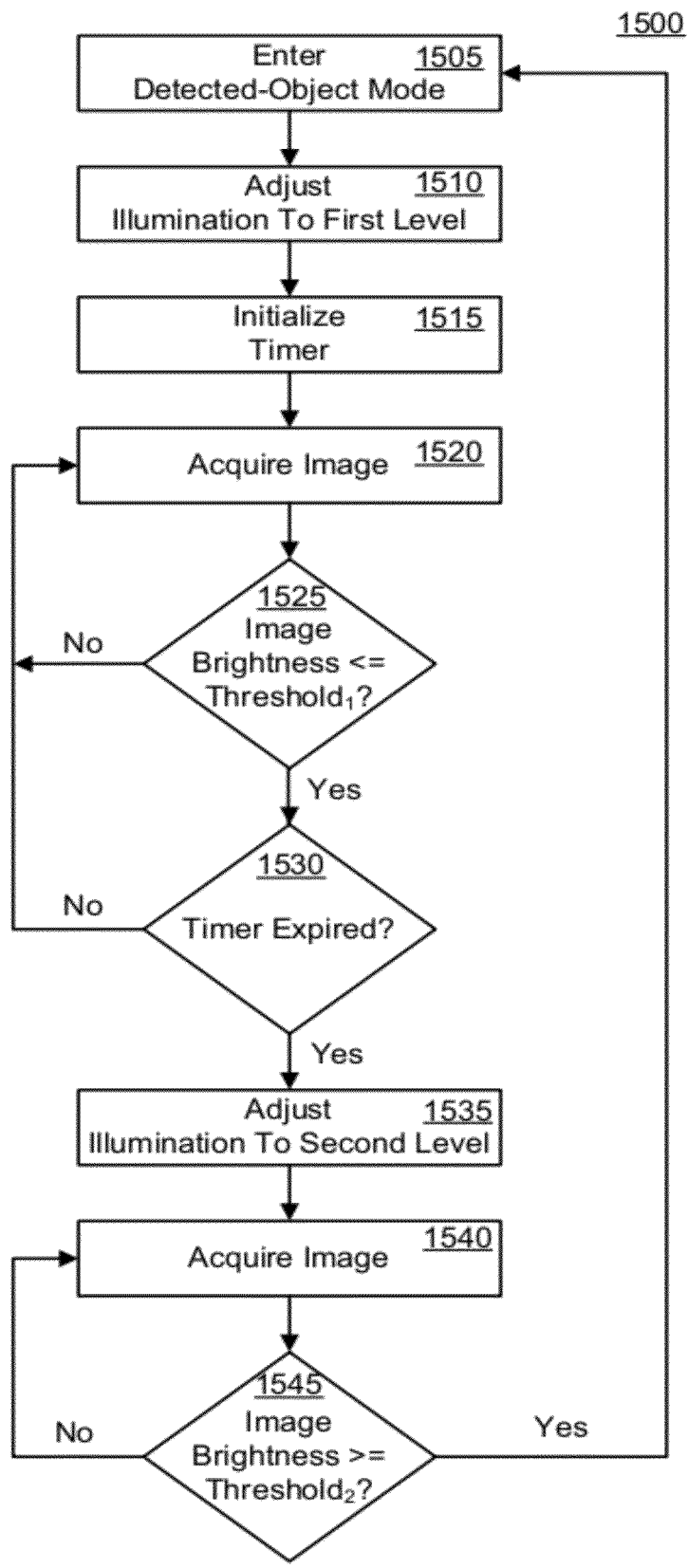
FIG. 15 is a flow chart of a method for illuminating a scan volume of an optical code reader, according to yet another embodiment.

FIG. 15 is a flow chart of a method 1500 for illuminating a scan volume of an optical code reader, such as the optical code reader 400, according to yet another embodiment. The illumination control algorithm described with reference to FIG. 15 preferably uses pulse width control to adjust the optical output of an illumination source. At step 1505, the optical code reader 400 enters a detected-object mode (e.g., the detected-object mode 510 or 910). For example, the optical code reader 400 may enter the detected-object mode after the optical code reader 400 starts up or is reset or the optical code reader 400 may enter the detected-object mode from another mode of operation, such as a default mode (e.g., the default mode 520 or 920), a sleep mode (e.g., the sleep mode 930), or an actuated mode (e.g., the actuated mode 940).

After the optical code reader 400 enters the detected-object mode, an illumination source (e.g., illumination source 110) associated with the optical code reader 400 is set to a first illumination level at step 1510. The step of setting the illumination source to the first illumination level comprises setting a pulse width of a driving waveform to a first predetermined pulse width. In one configuration, the first illumination level has associated therewith a user-configurable parameter, such as a pulse width of a driving waveform, so that the user can configure or program the first illumination level. For example, the user can select a brightness level from a list of available brightness levels (e.g., dim, medium, bright, other, high ambient, or low ambient). Table 2 illustrates an example illumination pulse width control truth table, which may be stored in one or more of the memory 170 (see FIG. 1), memory 182, or another suitable memory. If the user selects the bright level as the first illumination level, for example, the optical code reader 400 performs a lookup in the truth table (Table 2) and causes the illumination source to be driven with a waveform having a pulse width of 125 μsec. If the user does not select a brightness level for the first illumination level, the optical code reader 400 sets the first illumination level to a default setting, such as medium brightness. The illumination pulse width may be controlled by a processor or controller (e.g., the controller 140 in FIG. 1) and the waveform used to drive the illumination source at the selected pulse width may be generated by the processor, the controller, or a programmable logic device (PLD).

TABLE 2

| Selectable Brightness | Dim | Medium | Bright | Other | High Ambient | Low Ambient |
|---|---|---|---|---|---|---|
| Pulse Width (μsec) | 40 | 60 | 125 | 200 | 0 | 10–30 |
| Depth of Field (inches) | 2 | 5 | 8 | 9 | Sleep monitor or cell phone mode | Sleep monitor |

The pulse width associated with each of the various brightness levels may optionally be configurable by the user. For example, if the illumination pulse width control truth table illustrated in Table 2 is stored in a non-volatile memory, such as serial flash memory, the pulse width associated with each of the various brightness levels (e.g., dim, medium, bright, other, high ambient, or low ambient) may be changed by writing a new pulse width to an appropriate register in the PLD. For example, if the user would like to change the pulse width associated with the bright level from 125 μsec to 70 μsec, the user may enter the new pulse width (e.g., by scanning a configuration optical code or via a programming menu of the optical code reader 400) and the optical code reader 400 will store the new value for the bright level in the truth table.

The intensity of light within the scan volume of the optical code reader 400 when the optical code reader 400 is set to a given illumination level depends on several factors, such as the ambient light, the distance from the scanner window, lens system f-number (e.g., the diameter of an entrance pupil in terms of the focal length of the lens), and the reflectivity of the object surface. For example, Table 3 illustrates an example of the illuminance (lux) three inches from the scanner window (assuming no ambient light) when the illumination source associated with the optical code reader 400 is set to various illumination levels (e.g., "dim," "medium," and "bright"). The lux values in Table 3 are approximations of the illuminance (lux) three inches from the scanner window (assuming no ambient light) when an illumination source (e.g., an array including 12 LEDs) associated with the optical code reader 400 is driven with a 1 ampere waveform that is pulsed at a frequency of approximately 60 Hz with the noted pulse widths (e.g., 60, 125, or 200 μsec).

TABLE 3

| Selectable Brightness Level | Dim | Medium | Bright |
|---|---|---|---|
| Pulse width (μsec) at frequency of 60 Hz | 60 | 125 | 200 |
| Illuminance at 3 inches from scanner window (lux) | 44 | 90 | 145 |

After the illumination source associated with the optical code reader 400 is set to the first illumination level, the optical code reader 400 initializes a timer at step 1515. For example, the optical code reader 400 could set an image frame counter or a clock to a predetermined value (e.g., zero). At step 1520, the optical code reader 400 acquires or receives an image of the scan volume (e.g., by capturing the next image frame via the imager 120).

At step 1525, the optical code reader 400 compares the image brightness to a first predetermined threshold (e.g., $threshold_1$) to determine whether the image brightness is less than or equal to the first predetermined threshold. If the image brightness is greater than the first predetermined threshold, it is assumed that an object, such as an optical code, is within the scan volume and the optical code reader 400 repeats step 1520 (e.g., acquires another image and performs step 1525 again).

If, on the other hand, the image brightness is less than or equal to the first predetermined threshold, it is assumed that an object, such as an optical code, is not within the scan volume and the method 1500 proceeds to step 1530.

The image brightness can be compared to the first predetermined threshold in a number of ways, such as using a histogram of light luminance. According to one embodiment, the imager (e.g., the imager 120) comprises an 8-bit imager that outputs for each pixel an intensity value ranging from 0 to 255, 0 being a no light or dark condition (minimum intensity) and 255 being a saturated condition (maximum intensity). For a 10-bit value imager, each pixel value ranges from 0 to 1023. For each captured image, a histogram may be generated that indicates the number of pixels in the image that correspond to each digitized grayscale value. In certain embodiments, the total number of possible values is scaled by a factor to reduce the total number of bins in the histogram. In other words, the histogram may combine multiple digitized values into the same field or bin. For example, four neighboring digitized values may be combined into a single bin to generate a histogram having 64 bins (as opposed to 256 bins with an 8-bit imager). Reducing the number of bins or fields in the histogram helps reduce the amount of memory required to generate and store the histogram.

According to one embodiment, the imager generates a histogram for each image frame and outputs the histogram data along with the captured image data (e.g., an array of pixel values). According to another embodiment, a controller (e.g., the controller 140), processor, or the like generates a histogram for select image frames by using all or a portion of the captured image data (e.g., the pixel values output by the imager).

After the histogram is generated for the image that was captured at step 1520, the optical code reader 400 (e.g., the controller 140) compares the image histogram to a first histogram threshold value (e.g., the first threshold$_1$) to determine whether the image sensed by the imager sensor has a brightness above, below, or equal to the first threshold value. If the image brightness is above the first histogram threshold value, it is assumed that an object, such as an optical code, is within the scan volume (e.g., an object, such as an optical code, is in the near field) and the method 1500 captures another image frame at step 1520. If, on the other hand, the image brightness is equal to or below the first histogram threshold value, it is assumed that an object, such as an optical code, is not within the scan volume (or at least not within the near field of the scan volume) and the method 1500 proceeds to step 1530.

In one configuration, out of 256 grayscale values (8-bit image data where a higher value represents a higher light intensity), the first histogram threshold value is set to a value within the range of approximately 35 to approximately 50, and preferably approximately 36. Although 256 grayscale values are given as an example, the optical code reader 400 may calculate and use more or less than 256 grayscale values. For example, the first histogram threshold value may be set to 9 at binned 6-bit data, which is the equivalent of an 8-bit grayscale value of 36 at a defined pixel percentage of the histogram (where a higher grayscale value and bin number is brighter) assuming a total number of possible grayscale values of 256 is scaled by a factor of four. The first histogram threshold value may be programmable or configurable by the user (e.g., by scanning a configuration optical code or via a programming menu of the optical code reader 400).

One manner for comparing the image histogram to the first histogram threshold value includes determining the percentage of the light intensities of the image histogram that are at or below the first histogram threshold. If the percentage of light intensities at or below the first histogram threshold is equal to or greater than a selected percentage, it is assumed that an object, such as an optical code, is not within the scan volume (or at least the near field of the scan volume) and the illumination source is set to a second illumination level (e.g., a dim level) assuming that it is determined at step 1530 that the timer has expired. If, on the other hand, the percentage of light intensities at or below the first histogram threshold is less than the selected percentage, it is assumed that an object, such as an optical code, is within the scan volume and another image is captured at step 1520. The selected percentage may be any suitable percentage such as approximately 93% to approximately 99.5%, preferably greater than 99.3%. Thus, for example, with a first histogram threshold of 36 and a selected percentage of 98%, if 98% or more of the light intensities of the image histogram are at or below the grayscale value of 36, the method 1500 proceeds to step 1530. On the other hand, if less than 98% of the light intensities are at or below the grayscale value of 36, the method 1500 proceeds to step 1520. The selected percentage may be programmable or configurable by the user (e.g., by scanning a configuration optical code or via a programming menu of the optical code reader 400).

Figure 16A:
FIGS. 16B, 16D, and 17B illustrate various example histograms associated with respective example images of FIGS. 16A, 16C, and 17A.
Figure 16B:
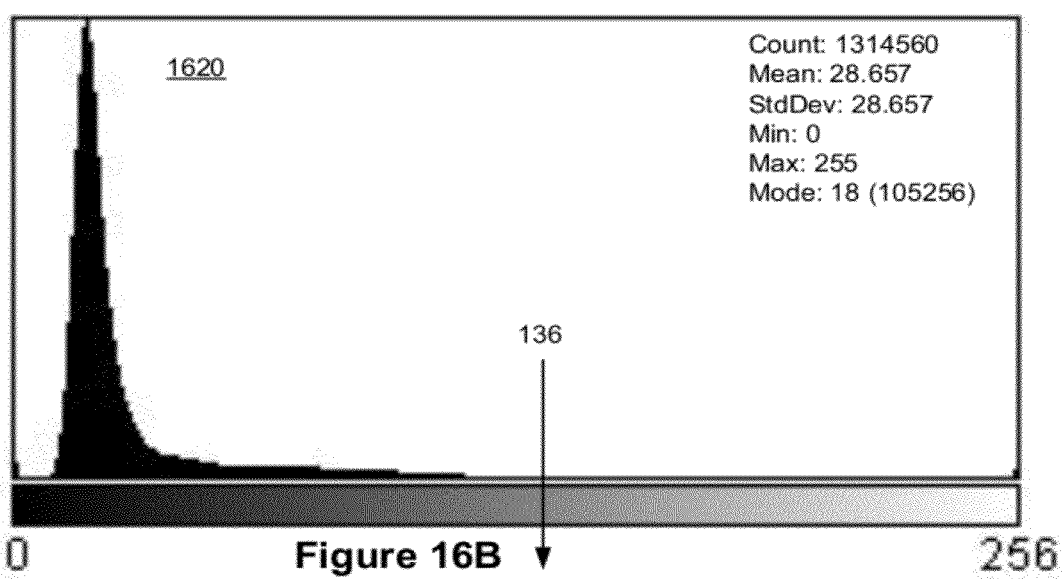
Figure 16C:
Figure 16D:
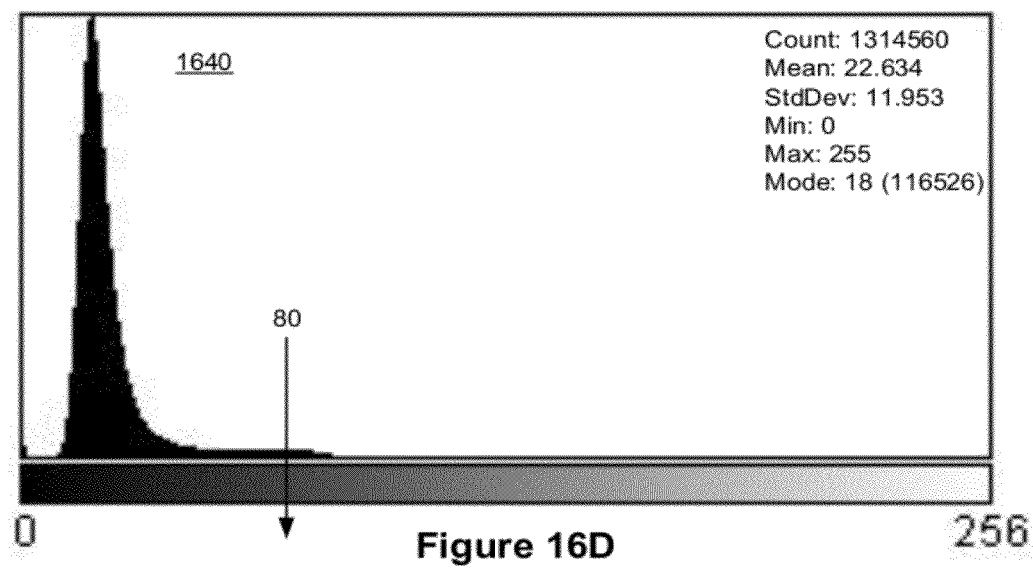

For example, if the first threshold$_1$ is set to 100, it is assumed that an object is within an image if the gray scale value of the current bin at the defined pixel percentage is greater than 100 and it is assumed that an object is not within an image if the gray scale value of the current bin at the defined pixel percentage is less than or equal to 100. FIG. 16B illustrates a histogram 1620 associated with an image 1610 in FIG. 16A and FIG. 16D illustrates a histogram 1640 associated with an image 1630 of FIG. 16C. Referring to FIGS. 16A and 16B, it is assumed for the purposes of step 1525 that the image 1610 does include an object because, as indicated in the histogram 1620, the gray scale value of the current bin at a defined pixel percentage of 0.5% is 136, which is greater than the first threshold$_1$ of 100. Thus, if the image 1610 is acquired at step 1520 and it is determined that the brightness of the image 1610 is greater than the first threshold$_1$ of 100 (e.g., current_bin/analog_gain$_1$>threshold$_1$), it is assumed for the purposes of step 1525 that an object is within the scan volume and the optical code reader 400 repeats step 1520 (e.g., acquires another image and performs step 1525 again). In contrast, with reference to FIGS. 16C and 16D, it is assumed for the purposes of step 1525 that the image 1630 does not include an object because, as indicated in the histogram 1640, the gray scale value of the current bin at the defined pixel percentage of 0.5% is 80, which is less than the first threshold$_1$ of 100. Thus, if the image 1630 is acquired at step 1520 and it is determined that the brightness of the image 1630 is less than or equal to the first threshold$_1$ of 100 (e.g., current_bin/analog_gain$_1$≤threshold$_1$), it is assumed for the purposes of step 1525 that an object is not within the scan volume and the method 1500 proceeds to step 1530. The gray scale values of the current bins illustrated in histograms 1620 and 1640 are contrived examples to illustrate comparing the gray scale value of the current bin to a predetermined threshold. The first predetermined threshold (threshold$_1$) may be set to a much lower value, such as a value within the range of approximately 35 to approximately 50.

Another manner for comparing the image histogram to the first histogram threshold value includes calculating an average grayscale value for the captured image using the image histogram and comparing the average grayscale value to the first histogram threshold. The average grayscale value may be adjusted by an analog gain factor. Because the average grayscale value (which may be adjusted by an analog gain factor) statistically represents a distance between the imager and an object, such as an optical code, comparing the average grayscale value to the first histogram threshold effectively determines whether an object is positioned in a certain portion of the scan volume, such as a near field or far field. For example, if an average grayscale value for an image is less than or equal to a first histogram threshold of 36, it may be assumed that an object is in a far field of the scan volume (i.e., that an object is not in the near field). Thus, if the average grayscale value for an image is less than or equal to the first histogram threshold, the method 1500 proceeds to step 1530. Otherwise, the method 1500 proceeds to step 1520.

At step 1530, the optical code reader 400 determines whether the timer (e.g., the timer that was initialized in step 1515) has expired before the optical code reader 400 sets the illumination source to a second illumination level. If it is determined that the timer has expired, the method 1500 proceeds to step 1535. Otherwise, the method 1500 proceeds to step 1520. In other words, the optical code reader 400 does not set the illumination source to the second illumination level unless the image brightness is at or below the first histogram threshold (step 1525) for a predetermined duration, such as a predetermined number of image frames or a predetermined period of time. According to certain embodiments, the predetermined duration is programmable or configurable by the user (e.g., by scanning a configuration optical code or via a programming menu of the optical code reader 400). If the user does not select a predetermined duration, the optical code reader 400 sets the predetermined duration to a default setting, such as five seconds.

At step 1535, the optical code reader 400 sets the illumination source to a second illumination level. The step of setting the illumination source to the second illumination level comprises setting a pulse width of a driving waveform to a second predetermined pulse width. According to one embodiment, the second illumination level has associated therewith a user-configurable parameter, such as a pulse width of a driving waveform, so that the user can configure or program the second illumination level. For example, the user can select a brightness level from a list of available brightness levels (e.g., dim, medium, bright, other, or ambient). If the user selects the dim level as the second illumination level, for example, the optical code reader 400 performs a lookup in the truth table (Table 2) and causes the illumination source to be driven with a waveform having a pulse width of 40 μsec. If the user does not select a brightness level for the second illumination level, the optical code reader 400 sets the second illumination level to a default setting, such as medium brightness. The illumination pulse width may be controlled by a processor or controller (e.g., the controller 140 in FIG. 1) and the waveform used to drive the illumination source at the selected pulse width may be generated by the processor, the controller, or a PLD.

According to certain embodiments, one or more in-between states are inserted between the first and second illumination levels for visual comfort. In other words, assuming the first illumination level is set to a bright level and the second illumination level is set to a dim level, the transition between the first and second illumination levels may be a gradual change (e.g., the illumination level ramps up or down). U.S. Patent Publication No. 2007/0284447, which is hereby incorporated by reference in its entirety, describes various methods of gradually increasing or decreasing the intensity of an illumination source perceptible to a user over time so as to reduce the user's fatigue and/or irritation associated with a transition between illumination levels.

At step 1540, the optical code reader 400 acquires or receives an image of the scan volume (e.g., by capturing the next image frame via the imager 120).

At step 1545, the optical code reader 400 compares the image brightness to a second predetermined threshold (e.g., threshold$_2$) to determine whether the image brightness is greater than or equal to the second predetermined threshold. If the image brightness is less than the second predetermined threshold, it is assumed that an object, such as an optical code, is not within the scan volume and the optical code reader 400 repeats step 1540 (e.g., acquires another image and performs step 1545 again). If, on the other hand, the image brightness is greater than or equal to the second predetermined threshold, it is assumed that an object, such as an optical code, is within the scan volume and the method 1500 proceeds to step 1505.

According to one embodiment, the image brightness is compared to the second predetermined threshold using a histogram of light luminance. The histogram may be generated by the imager or by a controller (e.g., the controller 140), processor, or the like based on all or a portion of the captured image data (e.g., the pixel values output by the imager).

After the histogram is generated for the image that was captured at step 1540, the optical code reader 400 (e.g., the controller 140) compares the image histogram to a second histogram threshold value (e.g., the second threshold$_2$) to determine whether the image sensed by the imager sensor has a brightness above, below, or equal to the second threshold value. If the image brightness is below the second histogram threshold value, it is assumed that an object, such as an optical code, is not within the scan volume and the method 1500 captures another image frame at step 1540. If, on the other hand, the image brightness is greater than or equal to the second histogram threshold value, it is assumed that an object, such as an optical code, is within the scan volume (e.g., an object, such as an optical code, is in the near field) and the method 1500 proceeds to step 1505.

According to one embodiment, out of 256 grayscale values (where a higher value represents a higher light intensity), the second histogram threshold value is set to a value within the range of approximately 20 to approximately 35, and preferably approximately 28. Although 256 grayscale values are given as an example, the optical code reader 400 may calculate and use more or less than 256 grayscale values. For example, the second histogram threshold value may be set to 7, which is the equivalent of an 8-bit grayscale value of 28 at a defined pixel percentage of the histogram (where a higher grayscale value and bin number is brighter) assuming a total number of possible grayscale values of 256 is scaled by a factor of four. According to certain embodiments, the second histogram threshold value is programmable or configurable by the user (e.g., by scanning a configuration optical code or via a programming menu of the optical code reader 400).

One example manner for comparing the image histogram to the second histogram threshold value includes determining the percentage of the light intensities of the image histogram that are at or below the first histogram threshold. If the percentage of light intensities at or above the second histogram threshold is equal to or greater than a selected percentage, it is assumed that an object, such as an optical code, is within the scan volume (e.g., an object, such as an optical code, is in the near field) and the optical code reader 400 enters the detected-object mode (e.g., the detected-object mode 510 or 910) at step 1505 and the illumination source is set to the first illumination level (e.g., a bright level) at step 1510. If, on the other hand, the percentage of light intensities at or above the second histogram threshold is less than the selected percentage, it is assumed that an object, such as an optical code, is not within the scan volume and another image is captured at step 1540. The selected percentage may be any suitable percentage such as approximately 90% to approximately 99.7%, preferably greater than 95%. Thus, for example, with a second histogram threshold of 28 and a selected percentage of 98%, if 98% or more of the light intensities of the image histogram are above or at the grayscale value of 28, the method 1500 proceeds to step 1505. On the other hand, if less than 98% of the light intensities are above or at the grayscale value of 28, the method 1500 proceeds to step 1540. According to certain embodiments, the selected percentage is programmable or configurable by the user (e.g., by scanning a configuration optical code or via a programming menu of the optical code reader 400).

Figure 17A:
Figure 17B:
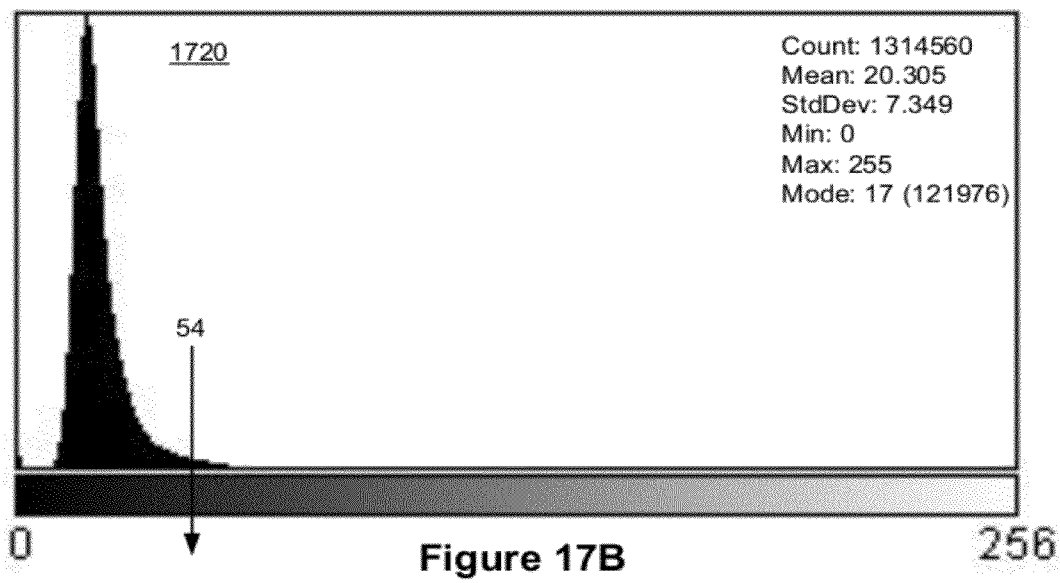

For example, if the second threshold$_2$ is set to 70, it is assumed for the purposes of step 1545 that an object is within an image if the gray scale value of the current bin at the defined pixel percentage is greater than or equal to 70 and it is assumed that an object is not within an image if the gray scale value of the current bin at the defined pixel percentage is less than 70. FIG. 17B illustrates a histogram 1720 associated with an image 1710 in FIG. 17A. It is assumed for the purposes of step 1545 that the image 1710 does not include an object because, as indicated in the histogram 1720, the gray scale value of the current bin at the defined pixel percentage of 0.5% is 54, which is less than the second threshold$_2$ of 70. Thus, if the image 1710 is acquired at step 1540 and it is determined that the brightness of the image 1710 is less than the second threshold$_2$ of 70 (e.g., current_bin/analog_gain$_1$<threshold$_2$), it is assumed for the purposes of step 1545 that an object is not within the scan volume and the optical code reader 400 repeats step 1540 (e.g., acquires another image and performs step 1545 again). In contrast, if the image 1630 (FIG. 16C) is captured at step 1540, it is assumed for the purposes of step 1545 that the image 1630 does include an object because, as indicated in the histogram 1640, the gray scale value of the current bin at a defined pixel percentage of 0.5% is 80, which is greater than the second threshold$_2$ of 70. Thus, if the image 1630 is acquired at step 1540 and it is determined that the brightness of the image 1630 is greater than or equal to the second threshold$_2$ of 70 (e.g., current_bin/analog_gain$_1$≥threshold$_2$), it is assumed for the purposes of step 1545 that an object is within the scan volume and the method 1500 proceeds to step 1505. The gray scale values of the current bins illustrated in histograms 1640 and 1720 are contrived examples to illustrate comparing the gray scale value of the current bin to a predetermined threshold. The second predetermined threshold (threshold$_2$) may be set to a much lower value, such as a value within the range of approximately 20 to approximately 35.

Table 4 presents various use case examples for the programmable illumination settings (e.g., the user-configurable parameters) associated with the first (1510) and second illumination levels (1535).

TABLE 4

| | | First Illumination Level | | |
|---|---|---|---|---|
| | | Bright (e.g., 125 μsec) | Medium (e.g., 60 μsec) | Dim (e.g., 40 μsec) |
| Second Illum. Level | Bright (e.g., 125 μsec) | 8" | N/A | N/A |
| | Medium (e.g., 60 μsec) | 1st Frame: 6" 2nd Frame and After: 8" | 6" | N/A |
| | Dim (e.g., 40 μsec) | 1st Frame: 4" 2nd Frame and After: 8" | 1st Frame: 4" 2nd Frame and After: 6" | 4" |

The optical code readers described herein (e.g., optical code readers 100, 200, and 400) preferably include a number user-configurable parameters, such as programmable illumination settings. For example, the optical output produced by an illumination source when the optical code reader 400 is operating in one of the various modes (e.g., the detected-object mode, the default mode, the actuated mode, and the sleep mode) may be programmable or configurable by the user. By way of another example, the pulse width and the amount of drive current used to drive the illumination source when the optical code reader 400 is operating in one of the various modes may be programmable or configurable by the user. By way of still another example, as described with reference to FIG. 15, the first and second histogram threshold values and the selected percentages associated therewith may be programmable or configurable by the user.

As previously described, the optical code reader 400 may be programmed or configured by scanning a configuration optical code. For example, the user-configurable parameters may be read by the optical code reader 400 from one or more configuration optical codes (e.g., optical codes having user-configurable parameters, instructions, or commands encoded therein). U.S. Pat. Nos. 4,866,257; 4,861,972; and 6,612,495, which are hereby incorporated by reference in their entireties, disclose examples on how an optical code reader may be configured by scanning a configuration optical code or by downloading information from a host computer.

Alternatively, the optical code reader 400 may be programmed or configured by entering a programming mode (e.g., by navigating to a programming menu of the optical code reader 400). For example, a display controller and display device may be configured to display a navigable menu system or graphical user interface (GUI) that allows the user to select and modify (e.g., via a user input device) the illumination settings or other user-configurable parameters. The display and user input device can be part of the optical code reader 400, or can be associated with an external device such as a personal computer, a personal digital assistant (PDA), or smart phone. If an external device is used, the illumination settings or other user-configurable parameters may be communicated from the external device to one or more optical code readers at some later point. The illumination settings or other user-configurable parameters may also be sent from the optical code reader 400 to an external device, for storage, and possible copying to other optical code readers. The communication between the optical code reader 400 and the external device may be wired or wireless, and may transmit data though any suitable digital communication medium including short distance networks, such as personal area networks, and long distance networks, such as the Internet. In addition, or alternatively, a removable memory, such as flash memory, having one or more user-configurable parameters stored thereon, may be coupled to the optical code reader 400 so that the optical code reader 400 may receive the user-configurable parameters without the use of a network interface.

Referring again to FIG. 4, the optical code reader 400 has associated therewith the scan volume 420. Conceptually, the scan volume 420 includes a portion of space in front the window 122 in which optical codes may be read (e.g., detected and decoded) by the optical code reader 400. Numerous factors affect the overall size and shape of the scan volume 420, such as the intensity and type of light illuminating the scan volume, the depth of field associated with the optical code reader 400 (e.g., the distance from the window 122 in which an optical code is in sufficient focus to be decoded), and the field of view (at the far focus limit distance of the depth of field) associated with the optical code reader 400. For example, the overall size of the scan volume 420 can be increased or decreased by changing the optical output of the illumination source 110, such as by increasing or decreasing a pulse width of a driving waveform, by increasing or decreasing an amount of current used to drive the illumination source 110, or by increasing or decreasing an amount of infrared light projected into the scan volume 420 by the illumination source 110.

If more than one imager is located behind the window 122, the optical code reader 400 may have multiple depths of field and fields of view associated therewith. Additionally, each imager may have multiple view points with corresponding fields of view if a set of N redirecting mirrors (where N≥1) are provided and configured to focus more than one area of interest onto an imager. In other words, instead of looking through the window in a certain direction (e.g., generally parallel to the X-axis), the scanner may effectively look through the window in multiple directions using the redirecting mirrors. For example, to increase the scan volume 420, the scanner associated with the window 122 may include a set of redirecting mirrors that effectively allow the scanner to look in three directions at once (e.g., parallel to the X-axis, an angle above the X-axis to expand the scan volume 420 in a vertically upward direction, and an angle below the X-axis to expand the scan volume 420 in a vertically downward direction). In other words, an image formed on the scanner's imager may effectively be divided into three sections. One section may look through the window 122 in a direction parallel to the X-axis, another section may look through the window 122 in a direction above the X-axis, and the remaining section may look through the window 122 in a direction below the X-axis. Further details of optical code readers having multiple image fields can be found in U.S. Application Publication No. 2007/0297021, which is hereby incorporated by reference in its entirety.

While the discussion of illuminating a scan volume of the optical code reader may have been described herein with reference to a single imager that does not utilize redirecting mirrors, the systems and methods described herein for illuminating a scan volume of the optical code reader are equally applicable to optical code readers including multiple imagers, each of which may utilize one or more redirecting mirrors. Together, the multiple imagers and redirecting mirrors help define a larger scan volume than may otherwise be defined by a single imager with no redirecting mirrors. For example, the scan volume may have larger dimensions and may be able to read optical codes on objects having various orientations within the scan volume because the scanner is effectively looking at the object from different points of view (e.g., the optical code reader may be able to read optical codes on various sides of an object without rotating the object within the scan volume because the optical code reader may be able to see the top, bottom, and one or more other sides of an object within the scan volume).

The scan volume 420 is generally not tightly bound by sharp dividing lines. For example, the sharpness of image data of an object (e.g., an optical code) within the depth of field gradually decreases as the object moves away from an ideal focus point. Further, the field of view generally increases with distance from the focusing optics 440. Thus, conceptually, the scan volume includes a portion of space proximate the optical code reader in which optical codes may be read (e.g., detected and decoded) by the optical code reader 400. In other words, the scan volume may be referred to as a volume within which there is a relatively high probability of a successful scan/read. A high-level overview of the depth of field and field of view concepts will be described with reference to FIGS. 18 and 19 along with a discussion of how depth of field and field of view interplay to form a scan volume.

Figure 18:
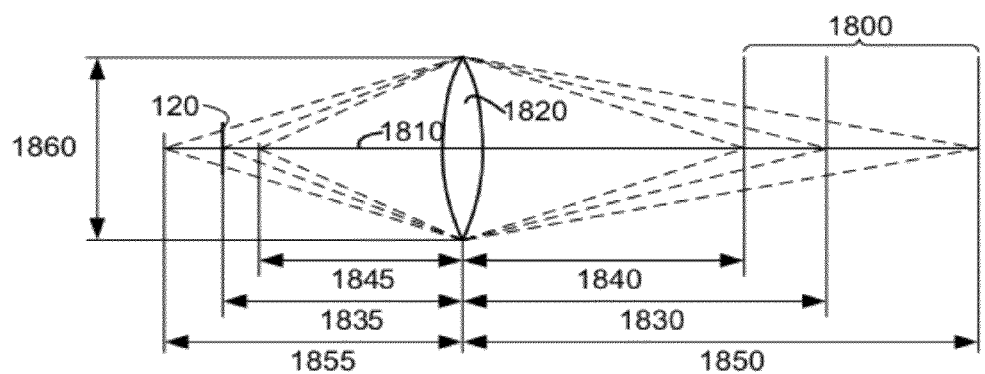
FIG. 18 is a focal plane diagram illustrating a depth of field associated with a single lens optical code reader, according to one embodiment.

FIG. 18 is a schematic diagram illustrating an example depth of field 1800 associated with a single lens optical code reader. The depth of field 1800 is the distance along an optical axis 1810 of lens 1820 in which an object, such as an optical code, appears to be in focus (or at least in sufficient focus to detect edge transitions of optical codes). An object, such as an optical code, positioned approximately a distance 1830 from the lens 1820 will be in best focus at approximately a distance 1835 from the lens 1820. Thus, the imager 120 may lie in a plane generally parallel to the lens 1820 and be positioned approximately a distance 1835 from the lens 1820. An object located approximately a distance 1840 from the lens 1820 (i.e., the near limit of the depth of field 1800) will be in best focus at approximately a distance 1845 from the lens 1820. However, the object will be in sufficient focus at approximately a distance 1835 from the lens 1820 (i.e., the location of the imager 120) for decoding purposes. Further, an object located approximately a distance 1850 from the lens 1820 (i.e., the far limit of the depth of field 1800) will be in best focus at approximately a distance 1855 from the lens 1820. However, the object will be in sufficiently good focus at approximately a distance 1835 from the lens 1820 (i.e., the location of the imager 120) for decoding purposes. An aperture size or aperture diameter 1860 helps define the depth of field 1800 (i.e., the distance between the near limit and far limit of the depth of field 1800). For example, decreasing the aperture diameter 1860 increases the depth of field 1800, but also reduces the amount of light transmitted through the lens 1820.

Referring again to FIG. 4, the scan volume 420 is bound in one respect by the depth of field associated with each imager. The depth of field itself is a function of the distance between the lens and the object, a focal length of the lens, the optical code element size, the aperture diameter of the lens, and the intensity and type of illumination. Thus, with respect to the imager 120 associated with the window 122, an optical code on an object positioned between the near and far limits of the depth of field (and facing the window 122) would be in sufficient focus to detect edge transitions of optical codes.

Figure 19:
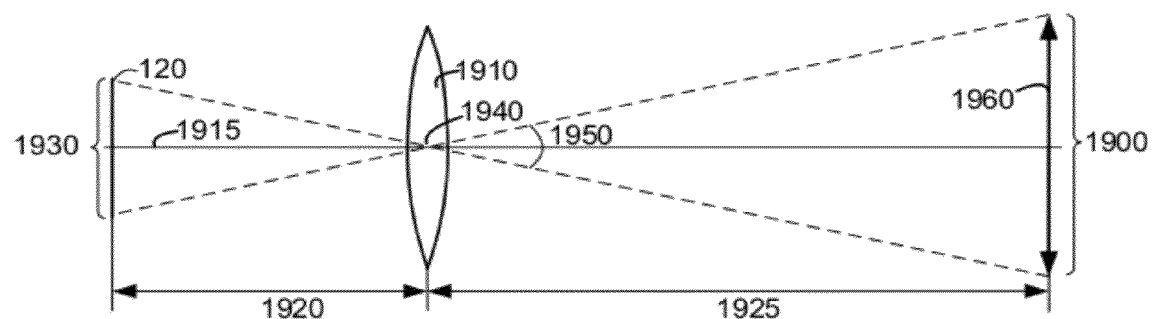
FIG. 19 is a focal plane diagram illustrating a field of view associated with a single lens optical code reader, according to one embodiment.

FIG. 19 is a schematic diagram illustrating an example field of view 1900 associated with an optical code reader. The field of view is the lateral extent orthogonal to an optical axis of a lens where an object positioned a certain distance from the lens is focused onto an imager of the optical code reader. The overall dimensions of the imager and the imager's position relative to the lens, the focal length of the lens, and the distance of an object from the lens define the field of view. For example, an imager 120 positioned a distance 1920 away from a lens 1910 and extending a distance 1930 in an orthogonal direction from an optical axis 1915 of the lens 1910 would have a field of view 1900 through a pinhole 1940 of the lens 1910 at a distance 1925 from the lens 1910. Thus, an object 1960 at a distance 1925 from the lens 1910 would occupy the full extent of the imager 120. Because the dimensions associated with the imager 120 are generally fixed, the field of view of the imager 120 through a pinhole 1940 of the lens 1910 will vary depending on the distance of the object from the lens 1910 (e.g., the field of view becomes smaller at a distance less than distance 1925). Thus, an angle of view 1950 may also be useful in describing an angular extent of an image that the imager 120 can capture through the lens 1910.

Referring again to FIG. 4, the scan volume 420 is bound in another respect by the field of view at the far limit of the depth of field associated with each scanner. Thus, with respect to the imager 120 associated with the window 122, an optical code on an object positioned anywhere within an area bound by the field of view at the far limit of the depth of field would be captured by the imager 120 and be in sufficient focus to detect edge transitions thereof. While the depth of field and the field of view (at the far limit of the depth of field) are two factors that affect the overall size of the scan volume, other factors also affect the ability to detect edge transitions of optical codes (and thus the overall size of the scan volume), such as the intensity and type of light illuminating the optical code.

Embodiments may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with optical codes or barcodes, including 1-D codes (such as UPC and EAN/JAN barcodes) and 2-D codes (such as PDF417 and Maxicode), it should be understood, however, that the embodiments described herein may be useful for readers used in connection with any type of code or symbol, including fingerprint capture, and nothing herein should be construed as limiting this disclosure to optical codes or any other particular type of code.

Thus, as should be appreciated in view of the teachings herein, certain embodiments may be capable of achieving certain advantages, including by way of example and not limitation one or more of the following: (1) providing a system and method for illuminating a scan volume of an optical code reader; (2) providing an optical code reader that includes programmable illumination settings; (3) providing an optical code reader that uses different programmable illumination based on the use case and the scanner mode to optimize the visual effect for the user; (4) providing an optical code reader that uses different programmable illumination based on the use case and the scanner mode to maintain sweep speed; (5) providing an optical code reader that uses different programmable illumination based on the use case and the scanner mode to maintain the first pass read rate; (6) providing an optical code reader that (a) has a default mode with a relatively dim illumination setting that allows an optical code to be read, but at a reduced depth of field for the image frame in which an object is detected, and (b) can read an optical code from the next image frame at a full working range; (7) providing an optical code reader having a customizable working range coverage for the detecting image frame; (8) providing an optical code reader having a default state in which the illumination has a short pulse width (dim) or is red only to improve the visual effect (e.g., not too bright) while being capable of reading an optical code if the optical code is swept through the scan volume in the near field and in which the optical code reader is capable of reading an optical code in the far field with the second or subsequent frame due to the field of view being larger at the far field as compared to the near field; (9) providing an optical code reader that uses a longer illumination pulse or that turns on additional infrared illumination when an optical code is detected so that an optical code can be read over the whole working range; (10) providing an optical code reader that returns to a default state if no object is in the scan volume for a fixed duration, such as ten frames; (11) providing an optical code reader that applies a different pulse width or different LED combination based on the scanner mode; (12) providing an optical code reader that optimizes the visual brightness and provides the user with flexibility with regard to brightness, depth of field, and sweep speed; (13) providing an optical code reader that saves energy; (14) providing an optical code reader that includes an additional illumination level between a normal scanning illumination level and a sleep illumination level (off); (15) providing an optical code reader having a scan volume that is easily configurable on-site; (16) providing an optical code reader having a variable scan volume that may adjusted at any time in response to changing circumstances; and (17) providing an optical code reader that includes multiple illumination modes, each of which may be configured by the user.

The terms and descriptions used above are set forth by way of illustration only and are not meant as limitations. Skilled persons will recognize that many variations can be made to the details of the above-described embodiments without departing from the underlying principles of the invention. The subject matter disclosed in any sentence or paragraph herein can be combined with the subject matter of one or more of any other sentences or paragraphs herein as long as such combinations are not mutually exclusive or inoperable.

The invention claimed is:

1. A method of illuminating a scan volume of an optical code reader, comprising the steps of:
    illuminating the scan volume of the optical code reader with an illumination source set at a first illumination mode, the first illumination mode having associated therewith a user-configurable parameter that at least partially defines a first depth of field of the optical code reader when the illumination source illuminates the scan volume;
    while the illumination source is in the first illumination mode, monitoring the scan volume for an indication of whether an object is detected in the scan volume; and
    if an object is detected in the scan volume while the illumination source is in the first illumination mode, illuminating the scan volume of the optical code reader with the illumination source set at a second illumination mode.

2. The method of claim 1, wherein monitoring the scan volume for an indication of whether an object is detected in the scan volume comprises processing image data associated with the scan volume for decodable data corresponding to an optical code.

3. The method of claim 1, further comprising:
    while the illumination source is in the second illumination mode, monitoring the scan volume for an indication of whether no object is detected in the scan volume; and
    if no object is detected in the scan volume while the illumination source is in the second illumination mode, automatically setting the illumination source associated with the optical code reader to the first illumination mode.

4. The method of claim 1, further comprising:
    while the illumination source is in the second illumination mode, monitoring the scan volume for an indication of whether no object is detected in the scan volume for a predetermined period of time; and
    if no object is detected in the scan volume for a predetermined period of time while the illumination source is in the second illumination mode, automatically setting the illumination source associated with the optical code reader to the first illumination mode.

5. The method of claim 1, further comprising:
in response to a user request to increase the first depth of field of the optical code reader when the illumination source is in the first illumination mode, updating the user-configurable parameter so that the first depth of field is increased from a first distance to a second distance that is greater than the first distance.

6. The method of claim 1, wherein the second illumination mode has associated therewith a user-configurable parameter that at least partially defines a second depth of field of the optical code reader when the illumination source illuminates the scan volume.

7. The method of claim 6, wherein the second depth of field is greater than the first depth of field.

8. The method of claim 1, wherein the optical code reader is a data acquisition device selected from the group consisting of an imaging reader and a laser scanner.

9. An optical code reader, comprising:
an illumination source configured to illuminate a scan volume of the optical code reader;
an imager configured to acquire an image of an optical code within the scan volume of the optical code reader; and
a controller in operative association with the illumination source and the imager, the controller configured to:
cause the illumination source to operate in a first illumination mode, the first illumination mode having associated therewith a user-configurable parameter that at least partially defines a first depth of field of the optical code reader when the illumination source illuminates the scan volume;
while the illumination source operates in the first illumination mode, cause the imager to acquire a first set of images of the scan volume, wherein the first set of images includes one or more images of the scan volume;
determine, based on the first set of images, whether an object is within the scan volume of the optical code reader; and
if it is determined, based on the first set of images, that an object is within the scan volume of the optical code reader, cause the illumination source to operate in a second illumination mode.

10. The optical code reader of claim 9, wherein the controller further configured to:
while the illumination source operates in the second illumination mode, cause the imager to acquire a second set of images of the scan volume, wherein the second set of images includes one or more images of the scan volume;
determine, based on the second set of images, whether an object is within the scan volume of the optical code reader; and
if it is determined, based on the second set of images, that no object is within the scan volume of the optical code reader, cause the illumination source to operate in the first illumination mode.

11. The optical code reader of claim 10, wherein the controller is configured to cause the illumination source to operate in the first illumination mode if it is determined that no object is within the scan volume of the optical code reader in a predetermined number of images in the second set of images.

12. The optical code reader of claim 10, wherein the controller is configured to cause the illumination source to operate in the first illumination mode if it is determined, based on the second set of images, that no object is within the scan volume of the optical code reader for a predetermined period of time.

13. The optical code reader of claim 10, wherein each image in the second set of images includes light intensity values corresponding to the intensity of light incident on sensor pixels of the imager and the controller is configured to:
calculate a percentage of the light intensity values in an image in the second set of images that are less than or equal to a light intensity threshold value,
compare the calculated percentage to a predetermined percentage to determine whether the calculated percentage is greater than or equal to the predetermined percentage, and
if it is determined that the calculated percentage is greater than or equal to the predetermined percentage, cause the illumination source to operate in the first illumination mode.

14. The optical code reader of claim 9, wherein the second illumination mode increases a depth of field of the optical code reader from the first depth of field to a second depth of field.

15. The optical code reader of claim 9, wherein:
the illumination source is configured to illuminate the scan volume with a series of illumination pulses having a pulse width,
the user-configurable parameter associated with the first illumination mode comprises the pulse width of the illumination pulses, and
the controller is configured to cause the pulse width of the illumination pulses to increase from a first pulse width to a second pulse width while the illumination source operates in the second illumination mode.

16. The optical code reader of claim 9, wherein:
the illumination source comprises at least one light-emitting diode,
the user-configurable parameter associated with the first illumination mode comprises a drive current of said at least one light-emitting diode, and
the controller is configured to cause the drive current of said at least one light-emitting diode to increase from a first drive current to a second drive current while the illumination source operates in the second illumination mode.

17. The optical code reader of claim 9, wherein:
the illumination source comprises at least one light-emitting diode that is configured to illuminate the scan volume with a series of illumination pulses having a pulse width,
the user-configurable parameter associated with the first illumination mode comprises the pulse width of the illumination pulses and a drive current of said at least one light-emitting diode,
the controller is configured to cause the drive current of said at least one light-emitting diode to increase from a first drive current to a second drive current while the illumination source operates in the second illumination mode, and
the controller is configured to cause the pulse width of the illumination pulses to increase from a first pulse width to a second pulse width while the illumination source operates in the second illumination mode.

18. The optical code reader of claim 9, wherein:
the illumination source comprises a first light-emitting diode that is configured to illuminate the scan volume with light having a wavelength within a wavelength band of approximately 380 nm to approximately 750 nm and a second light-emitting diode that is configured to illuminate the scan volume with light having a wavelength within a wavelength band of approximately 750 nm to approximately 300 μm, the controller is configured to cause only the first light-emitting diode to illuminate the scan volume while the illumination source operates in the first illumination mode, and the controller is configured to cause both the first and second light-emitting diodes to illuminate the scan volume while the illumination source operates in the second illumination mode.

19. The optical code reader of claim 9, wherein:

the controller is configured to determine, based on the first set of images, whether an object including an optical code is within the scan volume of the optical code reader by processing the first set of images for decodable data corresponding to an optical code, and the controller is configured to cause the illumination source to operate in the second illumination mode if it is determined, based on the first set of images, that an object including an optical code is within the scan volume of the optical code reader.

20. The optical code reader of claim 9, wherein each image in the first set of images includes light intensity values corresponding to the intensity of light incident on sensor pixels of the imager and the controller is configured to:

calculate a percentage of the light intensity values in an image in the first set of images that are greater than or equal to a light intensity threshold value, compare the calculated percentage to a predetermined percentage to determine whether the calculated percentage is greater than or equal to the predetermined percentage, and if it is determined that the calculated percentage is greater than or equal to the predetermined percentage, cause the illumination source to operate in the second illumination mode.

* * * * *